United States Patent
Ostrowski et al.

(10) Patent No.: US 11,961,259 B2
(45) Date of Patent: Apr. 16, 2024

(54) CAMERA ARRAY CALIBRATION IN A FARMING MACHINE

(71) Applicant: Blue River Technology Inc., Sunnyvale, CA (US)

(72) Inventors: James Patrick Ostrowski, Mountain View, CA (US); John William Peake, Mountain View, CA (US); Jacqueline Gao Song, San Francisco, CA (US)

(73) Assignee: BLUE RIVER TECHNOLOGY INC., Santa Clara, CA (US)

( * ) Notice: Subject to any disclaimer, the term of this patent is extended or adjusted under 35 U.S.C. 154(b) by 174 days.

(21) Appl. No.: 17/566,396

(22) Filed: Dec. 30, 2021

(65) Prior Publication Data

US 2023/0215048 A1    Jul. 6, 2023

(51) Int. Cl.
| | |
|---|---|
| G06T 7/70 | (2017.01) |
| A01B 69/00 | (2006.01) |
| G06T 7/73 | (2017.01) |
| G06T 7/80 | (2017.01) |
| G06V 20/10 | (2022.01) |
| G06V 20/56 | (2022.01) |

(52) U.S. Cl.
CPC .............. G06T 7/85 (2017.01); A01B 69/001 (2013.01); G06T 7/73 (2017.01); G06V 20/188 (2022.01); G06V 20/56 (2022.01); *G06T 2207/30188* (2013.01); *G06T 2207/30244* (2013.01)

(58) Field of Classification Search
None
See application file for complete search history.

(56) References Cited

U.S. PATENT DOCUMENTS

| | | |
|---|---|---|
| 2011/0310255 A1 | 12/2011 | Medeiros et al. |
| 2021/0118089 A1 | 4/2021 | Hare et al. |
| 2022/0375129 A1* | 11/2022 | Wang ........................ G06T 7/80 |

FOREIGN PATENT DOCUMENTS

| | | |
|---|---|---|
| WO | WO 2017/174250 A1 | 10/2017 |
| WO | WO 2017174250 A1 | 10/2017 |

OTHER PUBLICATIONS

Robinson et al. ( "Robust Accurate Extrinsic Calibration of Static Non-overlapping Cameras", Jul. 28, 2017 (Year: 2017).*

(Continued)

*Primary Examiner* — Samuel D Fereja
(74) *Attorney, Agent, or Firm* — Fenwick & West LLP

(57) ABSTRACT

The calibration system of the farming machine receives images from each camera of the camera array. The images comprise visual information representing a view of a portion of an area surrounding the farming machine. To calibrate a pair of cameras including a first camera and second camera, the calibration system determines a relative pose between the pair of cameras by extracting relative position and orientation characteristics from visual information in both an image received from the first camera and an image received from the second camera. The calibration system identifies a calibration error for the pair of cameras based on a comparison of the relative pose with an expected pose between the first pair of cameras. The calibration system transmits a notification to an operator of the farming machine that describes the calibration error and instructions for remedying the calibration error.

23 Claims, 12 Drawing Sheets

(56) References Cited

OTHER PUBLICATIONS

Extended European Search Report and Written Opinion issued in European Patent Application No. 22214402.4, dated May 17, 2023, in 09 pages.
Robinson Andreas et al: "Robust Accurate Extrinsic Calibration of Static Non-overlapping Cameras", Jul. 28, 2017, SAT 2015 18th International Conference, Austin, TX, USA, Sep. 24-27, 2015; [Lecture Notes in Computer Science; Lect.Notes Computer], Springer, Berlin, Heidelberg, pp. 342-353, ISBN: 978-3-540-74549-5 [retrieved on Jul. 28, 2017].
Zhen Liu et al: "Novel calibration method for non-overlapping multiple vision sensors based on 1D target", Optics and Lasers in Engineering, Elsevier, Amsterdam, NL, vol. 49, No. 4, Nov. 3, 2010, pp. 570-577, DOI: 10.1016/J.OPTLASENG.2010.11.002 [retrieved on Nov. 17, 2010].
European Patent Office, Extended European Search Report and Written Opinion, European Patent Application No. 22214402.4, dated May 17, 2023, 9 pages.
Robinson, A. et al. "Robust Accurate Extrinsic Calibration of Static Non-Overlapping Cameras," *Computer Analysis of Images and Patterns: 17th International Conference*, Aug. 22-24, 2017, pp. 1-12.
Zhen, L. et al. "Novel Calibration Method for Non-Overlapping Multiple Vision Sensors Based on 1D Target," *Optics and Lasers in Engineering*, vol. 49, No. 1, Apr. 2011, pp. 570-577.
IP Australia, Examination Report and Written Opinion, Australian Patent Application No. 2022283668, dated Sep. 25, 2023, 5 pages.

\* cited by examiner

Method
400

Accessing a first image captured by a first camera and a second image image captured by a second camera
410

Extracting position and orientation characteristics for the first camera and the second camera by comparing visual information in the accessed images
420

Determining a relative pose for the pair of cameras including the first and second camera based on the extracted position and orientation characteristics
430

Identifying a calibration error for the pair of cameras based on the relative pose determined for the pair of cameras
440

Transmitting a notification to an operator with instructions to remedy the calibration error by adjusting the position and orientation of at least one of the cameras identified in the calibration error
450

FIG. 4

CAMERA ARRAY CALIBRATION IN A FARMING MACHINE

BACKGROUND

Field of Disclosure

This disclosure relates to systems and techniques for calibrating cameras on a farming machine and, more specifically, to identifying a calibration error between a pair of cameras on the farming machine based on a relative pose between the pair of cameras.

DESCRIPTION OF THE RELATED ART

A farming machine in a field relies on data gathered by sensors on the farming machine to inform how the farming machine operates to complete farming objectives in a field. For example, an image of a plant in a field may provide insight regarding how the farming machine should treat the plant. However, as the farming machine navigates through an environment, sensors on the farming machine may be knocked out of alignment by collisions with objects in the environment or due to uneven terrain. The farming machine may be unable to process images captured by unaligned cameras, so there exists a need to detect such misalignments in a camera array both before the farming machine begins to navigate through an environment and in real-time as the farming machine navigates through an environment.

SUMMARY

A farming machine is described which includes one or more cameras for capturing images before and as the farming machine moves through a field. The captured images include visual information representing features in the field of view of the camera, including parts of the farming machine, a portion of an area surrounding the farming machine, and fiducial markers in the area surrounding the farming machine. The farming machine includes a calibration system, which identifies calibration errors between pairs of cameras.

The calibration system of the farming machine receives images from each camera of the camera array. The images comprise visual information representing a view of a portion of an area surrounding the farming machine. To calibrate a first pair of cameras that includes a first camera and second camera of the camera array, the calibration system determines a first relative pose between the first pair of cameras by extracting relative position and orientation characteristics from visual information in both an image received from the first camera and an image received from the second camera. The calibration system identifies a calibration error for the first pair of cameras based on a comparison of the first relative pose with an expected pose between the first pair of cameras. The expected pose may be described in a virtual representation of the farming machine. The calibration system transmits a notification to an operator of the farming machine that describes the calibration error and instructions for remedying the calibration error.

The calibration system may further access the relative pose between the first camera and the second camera ("the first relative pose") and a second relative pose between the second camera and third camera. The calibration system determines that the second camera is adjacent to both the first camera and the third camera based on a comparison of the first relative pose and the second relative pose and, in response, updates the calibration error for the first pair of cameras based on the second relative pose.

Where the visual information of the image captured by the first camera comprises one or more parts of the farming machine, the calibration system may determine a position of the first camera on the farming machine based on the visual information of the image captured by the first camera and determines a position of the second camera on the farming machine based on the position of the first camera. The calibration system determines the first relative pose based on the determined first position and the determined second position.

From the plurality of cameras, the calibration system may identify a first end camera positioned at a first end of the mounting mechanism and a second end camera positioned at a second end of the mounting mechanism based on hardware addresses defined in the virtual representation of the farming machine for each camera of the plurality of cameras. The calibration system may calibrate the first end camera and the second end camera by determining a calibration error between the first end camera and the second end camera based on a comparison of a relative pose between the first end camera and the second end camera with an expected pose between the first end camera and the second end camera. The calibration system distributes the calibration error across a plurality of camera pairs of the plurality of cameras located between the first end camera and the second end camera.

Where the first image and the second image comprise a part of the farming machine, the calibration system may extract position characteristics from both visual information of the first image representing the part of the farming machine and visual information of the second image representing the part of the farming machine. The extracted position characteristics describe the pose of the first camera relative to the part of the farming machine and the pose of the second camera relative to the part of the farming machine, respectively. The calibration system determines the first relative pose by comparing the extracted position characteristics from the visual information of the first image and the visual information of the second image.

Where the first image and the second image comprise a fiducial marker in the portion of the area surrounding the farming machine, the calibration system may extract position characteristics from both visual information of the first image representing the fiducial marker and visual information of the second image representing the fiducial marker. The calibration system determines the first relative pose by comparing the extracted position characteristics from the visual information of the first image and the visual information of the second image.

To determine the relative pose between the first pair of cameras, the calibration system may measure a first height of the first camera relative to a ground surface and a second height of the second camera relative to the ground surface using a sensor mounted on the farming machine. The calibration system determines a scale factor for relative pose determination based on the measured first height and second height and determining the first relative pose based on the scale factor.

To determine the relative pose between the first pair of cameras, the calibration system may determine a first angle of the first camera relative to a ground surface and a second angle of the second camera relative to the ground surface and determine the first relative pose based on the first angle and the second angle.

To determine the relative pose between the first pair of cameras, the calibration system may determine a scale factor for the first camera and the second camera, where the scale factor represents a quantification of a relationship between distances captured in the first image and the second image and actual distances in the area surrounding the farming machine. The calibration system determines the relative first pose between the first pair of cameras based on the scale factor.

From the virtual representation of the farming machine, the calibration system may access a first position associated with a first processor operating the first camera using on a first hardware address of the first camera and a second position associated with a second processor operating the second camera using on a second hardware address of the second camera. The calibration system determines the expected pose between the first pair of cameras by comparing first position associated with the first hardware address and the second position associated with the second hardware address.

Where the second camera is positioned on the farming machine adjacent to the first camera, the calibration system further compares visual information of the first image to visual information of the second image. If the calibration system determines that the visual information of the first image does not overlap with visual information of the second image, the calibration system compares the visual information of the first image to visual information of images captured by other cameras of the plurality of cameras and identifies a third camera that captured an image with visual information overlapping with the visual information of the first image. The calibration system transmits a notification to the operator that identifies the first camera and the third camera are an adjacent pair of cameras.

BRIEF DESCRIPTION OF DRAWINGS

FIG. 4 is a flowchart illustrating a method for calibrating pairs of cameras in an array of cameras, in accordance with an example embodiment.

Figure 1A:
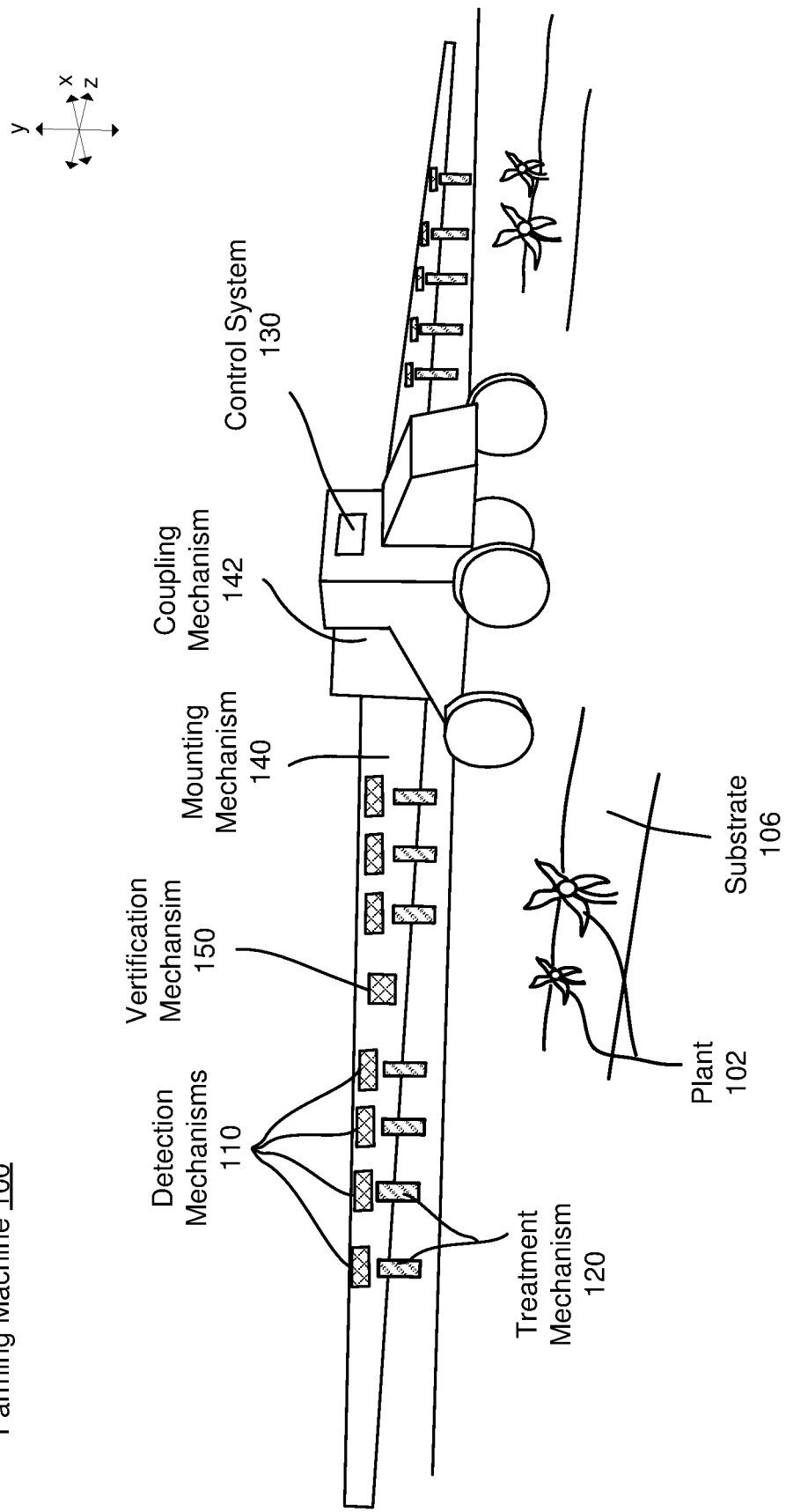
FIG. 1A illustrates an isometric view of a front-side of a farming machine, in accordance with an example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Introduction

A farming machine includes one or more cameras capturing images of an area surrounding the farming machine. Though labeled as a "farming machine" throughout the following description, the farming machine may be any machine that calibrates an array of cameras. The images include visual information representing features captured in the image, such as crops, weeds, ground conditions, parts of the machines, and fiducial markers in the area surrounding the farming machine.

The farming machine includes a calibration system that processes visual information captured by a pair of cameras. In processing, the farming machine extracts information describing relative position and orientation information to determine a relative pose between the pair of cameras. As described herein, a relative pose between a pair of cameras describes the position and orientation of one camera of the pair relative to the other. Based on the relative pose between the pair of cameras, the calibration system identifies a calibration error for the pair of cameras and transmits an error notification to an operator of the farming machine that notifies the operator of the calibration error. The notification to the operator may additionally include instructions or recommendations for the operator to adjust position and orientation characteristics of at least one of the cameras affected by the calibration error.

The calibration system may identify calibration errors given the relative pose of a pair of cameras using a variety of methods. As a first example, the calibration system may determine that one camera of a pair of cameras is tilted at an angle relative to the other camera of the pair. As a second example, the calibration system may determine that one camera of the pair is mounted to the farming machine in an inverted position relative to the other camera. As a third example, the calibration system may determine that one camera of the pair has been coupled to an inappropriate processing unit. As a fourth example, the calibration system may determine if wires of a camera have been plugged into inappropriate ports, hereafter referred to as "cable swapping," by identifying matches between sets of cameras. To illustrates, in an embodiment where four cameras are attached to a processing unit, the calibration system evaluates all 6 permutations of matches between the four cameras. As a fifth example, the calibration system may perform pairwise checks across all cameras to test for cable swapping across the entire camera array or may limit the pairwise checks based on processing units to which each camera can feasibly be coupled. Other examples are possible. The error notification may describe the identified calibration error and generate instructions for remedying the error (e.g., adjusting the tilted camera, rotating the inverted cameras, or rewiring the camera to the appropriate processing unit).

In an example embodiment, the farming machine is configured with a mechanism to which the cameras discussed above are attached, hereafter referred to as mounting mechanisms. The farming machine may identify calibration errors between pairs of cameras and generate instructions to remedy such calibration errors. Camera calibration may be performed before or during deployment of the farming machine.

Before the farming machine begins navigating through an environment, cameras on a mounting mechanism of the farming machine are positioned in a folded configuration. As described herein, a camera in a folded configuration is positioned and oriented such that the field of view of the camera captures images of predominantly the farming machine. For example, a boom sprayer is configured with mounting mechanisms that extend laterally away from the cab of the boom sprayer. In the folded configuration, the mounting mechanisms of a boom sprayer are folded against a side of the boom sprayer such that cameras on the mounting mechanism face the side of the boom sprayer.

When navigating in an environment (i.e., during deployment), cameras on the mounting mechanism of the farming are positioned in an unfolded configuration. As described herein a camera in an unfolded configuration is positioned and oriented such that the field of view of the camera captures images of predominantly the area surrounding the machine. In some embodiments, cameras on the mounting mechanism are positioned and oriented towards the ground to capture the soil or gravel surrounding the farming machine and, in some implementations, the wheels of the farming machine.

Continuing from the above example, mounting mechanisms in an unfolded configuration are extended perpendicular to the cab of the boom sprayer such that cameras on the mounting mechanism face the ground below the mounting mechanism. In some embodiments, the cameras are tilted at an angle, for example 28 degrees (although other angles are also possible), to capture the ground surface ahead of the mounting mechanism. Calibration errors between pairs of cameras on the mounting mechanism may be identified based on visual information captured during the deployment of the farming machine.

The cameras mounted to the farming machine are configured to capture images of plants and other features in an area as the farming machine traverses through an area to complete a farming objective. The captured images may include visual information such as, for example, color information encoded as pixels in an image (e.g., three channels in an RGB image), or some other visual information. Though the following description is described in relation to visual information in images, in some instances, other types of sensor data may be additionally employed by the farming machine to calibrate cameras mounted to the farming machine. Examples of other types of sensor data include LiDAR, ultrasound, or radar data captured by the sensors on the farming machine.

II. Farming Machine

II. A Example Machine Configurations

Figure 1B:
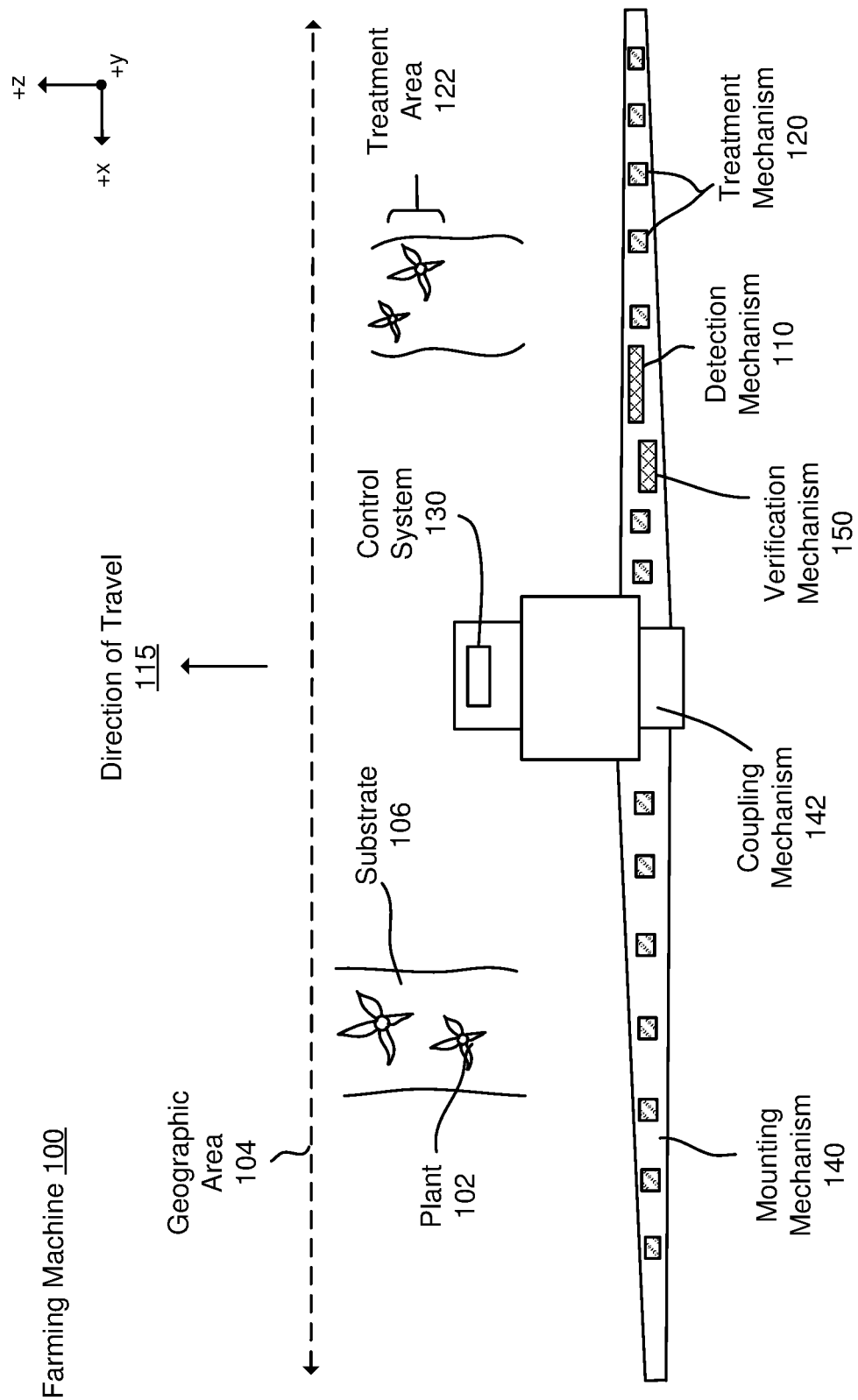
FIG. 1B illustrates a top view of a farming machine, in accordance with an embodiment.
Figure 1C:
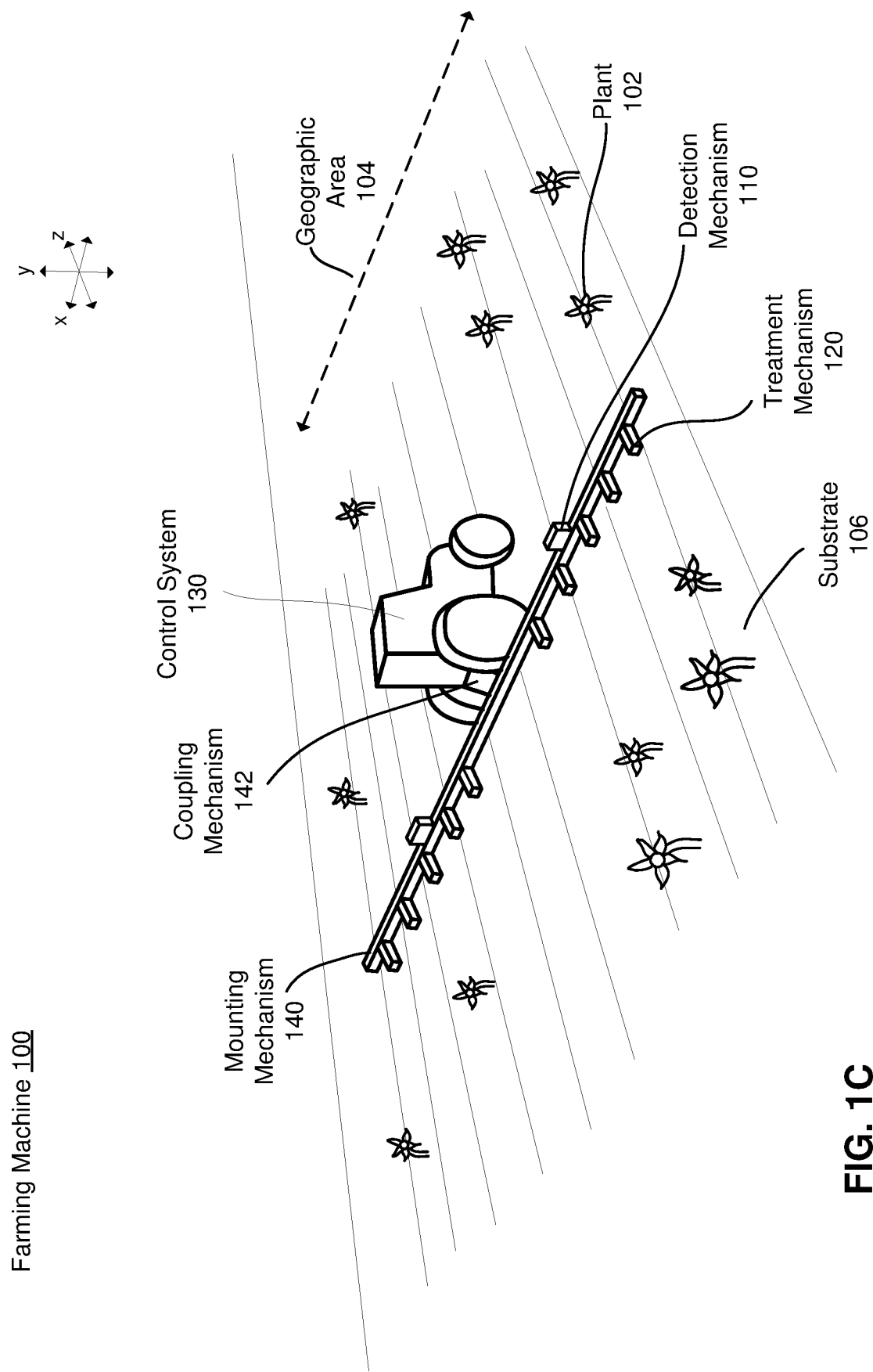
FIG. 1C illustrates an isometric view of a rear-side of a farming machine, in accordance with an example embodiment.

A farming machine that identifies and treats plants may have a variety of configurations, some of which are described in greater detail below. FIG. 1A is an isometric view of a second embodiment of a farming machine and FIG. 1B is a top view of the second embodiment of the farming machine of FIG. 1A. FIG. 1C is a third embodiment of a farming machine, in accordance with an example embodiment. The farming machine 100, illustrated in FIGS. 1A-1C, includes detection mechanisms 110, treatment mechanisms 120, and a control system 130. The farming machine 100 can additionally include a mounting mechanism 140, a verification mechanism 150, a power source, digital memory, communication apparatus, or any other suitable component. The farming machine 100 can include additional or fewer components than described herein. Furthermore, the components of the farming machine 100 can have different or additional functions than described below.

The farming machine 100 functions to apply a treatment to one or more plants 102 within a geographic area 104. Often, treatments function to regulate plant growth. The treatment is directly applied to a single plant 102 (e.g., hygroscopic material), but can alternatively be directly applied to multiple plants, indirectly applied to one or more plants, applied to the environment associated with the plant (e.g., soil, atmosphere, or other suitable portion of the plant environment adjacent to or connected by an environmental factor, such as wind), or otherwise applied to the plants. Treatments that can be applied include necrosing the plant, necrosing a portion of the plant (e.g., pruning), regulating plant growth, or any other suitable plant treatment. Necrosing the plant can include dislodging the plant from the supporting substrate 106, incinerating a portion of the plant, applying a treatment concentration of working fluid (e.g., fertilizer, hormone, water, etc.) to the plant, or treating the plant in any other suitable manner. Regulating plant growth can include promoting plant growth, promoting growth of a plant portion, hindering (e.g., retarding) plant or plant portion growth, or otherwise controlling plant growth. Examples of regulating plant growth includes applying growth hormone to the plant, applying fertilizer to the plant or substrate, applying a disease treatment or insect treatment to the plant, electrically stimulating the plant, watering the plant, pruning the plant, or otherwise treating the plant. Plant growth can additionally be regulated by pruning, necrosing, or otherwise treating the plants adjacent the plant.

The plants 102 can be crops but can alternatively be weeds or any other suitable plant. The crop may be cotton, but can alternatively be lettuce, soybeans, rice, carrots, tomatoes, corn, broccoli, cabbage, potatoes, wheat or any other suitable commercial crop. The plant field in which the system is used is an outdoor plant field, but can alternatively be plants within a greenhouse, a laboratory, a grow house, a set of containers, a machine, or any other suitable environment. The plants are grown in one or more plant rows (e.g., plant beds), wherein the plant rows are parallel, but can alternatively be grown in a set of plant pots, wherein the plant pots can be ordered into rows or matrices or be randomly distributed, or be grown in any other suitable configuration. The crop rows are generally spaced between 2 inches and 45 inches apart (e.g. as determined from the longitudinal row axis), but can alternatively be spaced any suitable distance apart, or have variable spacing between multiple rows.

The plants 102 within each plant field, plant row, or plant field subdivision generally includes the same type of crop (e.g., same genus, same species, etc.), but can alternatively include multiple crops (e.g., a first and a second crop), both of which are to be treated. Each plant 102 can include a stem, arranged superior (e.g., above) the substrate 106, which supports the branches, leaves, and fruits of the plant. Each plant can additionally include a root system joined to the stem, located inferior the substrate plane (e.g., below ground), that supports the plant position and absorbs nutrients and water from the substrate 106. The plant can be a vascular plant, non-vascular plant, ligneous plant, herbaceous plant, or be any suitable type of plant. The plant can have a single stem, multiple stems, or any number of stems.

The plant can have a tap root system or a fibrous root system. The substrate 106 is soil but can alternatively be a sponge or any other suitable substrate.

A detection mechanism 110 is configured to identify a plant for treatment. As such, the detection mechanism 110 can include one or more sensors for identifying a plant. For example, the detection mechanism 110 can include a multispectral camera, a stereo camera, a CCD camera, a single lens camera, hyperspectral imaging system, LIDAR system (light detection and ranging system), a depth sensing system, dynamometer, IR camera, thermal camera, humidity sensor, light sensor, temperature sensor, or any other suitable sensor. In one embodiment, and described in greater detail below, the detection mechanism 110 includes an array of image sensors configured to capture an image of a plant. In some example systems, the detection mechanism 110 is mounted to the mounting mechanism 140, such that the detection mechanism 110 traverses over a geographic location before the treatment mechanism 120 as the farming machine 100 moves traverses through the geographic location. However, in some embodiments, the detection mechanism 110 traverses over a geographic location at substantially the same time as the treatment mechanism 120. In an embodiment of the farming machine 100, the detection mechanism 110 is statically mounted to the mounting mechanism 140 proximal the treatment mechanism 120 relative to the direction of travel 115. In other systems, the detection mechanism 110 can be incorporated into any other component of the farming machine 100.

The treatment mechanism 120 functions to apply a treatment to an identified plant 102. The treatment mechanism 120 applies the treatment to the treatment area 122 as the farming machine 100 moves in a direction of travel 115. The effect of the treatment can include plant necrosis, plant growth stimulation, plant portion necrosis or removal, plant portion growth stimulation, or any other suitable treatment effect as described above. The treatment can include plant 102 dislodgement from the substrate 106, severing the plant (e.g., cutting), plant incineration, electrical stimulation of the plant, fertilizer or growth hormone application to the plant, watering the plant, light or other radiation application to the plant, injecting one or more working fluids into the substrate 106 adjacent to the plant (e.g., within a threshold distance from the plant), or otherwise treating the plant. In one embodiment, the treatment mechanisms 120 are an array of spray treatment mechanisms. The treatment mechanisms 120 may be configured to spray one or more of: an herbicide, a fungicide, water, or a pesticide. The treatment mechanism 120 is operable between a standby mode, wherein the treatment mechanism 120 does not apply a treatment, and a treatment mode, wherein the treatment mechanism 120 is controlled by the control system 130 to apply the treatment. However, the treatment mechanism 120 can be operable in any other suitable number of operation modes.

The farming machine 100 may include one or more treatment mechanisms 120. A treatment mechanism 120 may be fixed (e.g., statically coupled) to the mounting mechanism 140 or attached to the farming machine 100 relative to the detection mechanism 110. Alternatively, the treatment mechanism 120 can rotate or translate relative to the detection mechanism 110 and/or mounting mechanism 140. In one variation, such as in FIGS. 1A-1B, the farming machine 100a includes a single treatment mechanism, wherein the treatment mechanism 120 is actuated or the farming machine 100a moved to align the treatment mechanism 120 active area 122 with the targeted plant 102. In a second variation, the farming machine 100 includes an assembly of treatment mechanisms, wherein a treatment mechanism 120 (or subcomponent of the treatment mechanism 120) of the assembly is selected to apply the treatment to the identified plant 102 or portion of a plant in response to identification of the plant and the plant position relative to the assembly. In a third variation shown, such as in FIGS. 1C-1E, the farming machine (i.e., 100b, 100c) includes an array of treatment mechanisms 120, wherein the treatment mechanisms 120 are actuated or the farming machine (i.e., 100b, 100c) is moved to align the treatment mechanism 120 active areas 122 with the targeted plant 102 or plant segment.

The farming machine 100 includes a control system 130 for controlling operations of system components. The control system 130 can receive information from and/or provide input to the detection mechanism 110, the verification mechanism 150, and the treatment mechanism 120. The control system 130 can be automated or can be operated by a user. In some embodiments, the control system 130 may be configured to control operating parameters of the farming machine 100 (e.g., speed, direction). The control system 130 also controls operating parameters of the detection mechanism 110. Operating parameters of the detection mechanism 110 may include processing time, location and/or angle of the detection mechanism 110, image capture intervals, image capture settings, etc. The control system 130 can apply one or more models to identify one or more obstructions in the field. In some embodiments, the control system 130 applies an obstruction identification model to identify obstructions, described in greater detail below. The control system 130 may be coupled to the farming machine 100 such that an operator (e.g., a driver) can interact with the control system 130. In one embodiment, the control system 130 is physically removed from the farming machine 100 and communicates with system components (e.g., detection mechanism 110, treatment mechanism 120, etc.) wirelessly.

In some configurations, the farming machine 100 includes a mounting mechanism 140 that functions to provide a mounting point for the system components. In one example, as shown in FIG. 1A-1B, the mounting mechanism 140 statically retains and mechanically supports the positions of the detection mechanism 110, the treatment mechanism 120, and the verification mechanism 150 relative to a longitudinal axis of the mounting mechanism 140. The mounting mechanism 140 is a chassis or frame but can alternatively be any other suitable mounting mechanism. In the embodiment of FIGS. 1A-C the mounting mechanism 140 extends outward from a body of the farming machine (i.e., 100b, 100c) in the positive and negative y-direction (in the illustrated orientation of FIGS. 1A-1C) such that the mounting mechanism 140 is approximately perpendicular to the direction of travel 115. The mounting mechanism 140 in FIGS. 1C-1E includes an array of treatment mechanisms 120 positioned laterally along the mounting mechanism 140. In alternate configurations, there may be no mounting mechanism 140, the mounting mechanism 140 may be alternatively positioned, or the mounting mechanism 140 may be incorporated into any other component of the farming machine 100.

The farming machine 100 includes a first set of coaxial wheels and a second set of coaxial wheels, wherein the rotational axis of the second set of wheels is parallel with the rotational axis of the first set of wheels. In the first embodiment, each wheel in each set is arranged along an opposing side of the mounting mechanism 140 such that the rotational axes of the wheels are approximately perpendicular to the mounting mechanism 140. In the second and third embodiments of the farming machine, the rotational axes of the wheels are approximately parallel to the mounting mechanism 140. In alternative embodiments, the system can include any suitable number of wheels in any suitable configuration. The farming machine 100 may also include a coupling mechanism 142, such as a hitch, that functions to removably or statically couple to a drive mechanism, such as a tractor, more to the rear of the drive mechanism (such that the farming machine 100 is dragged behind the drive mechanism), but can alternatively be attached to the front of the drive mechanism or to the side of the drive mechanism. Alternatively, the farming machine 100 can include the drive mechanism (e.g., a motor and drive train coupled to the first and/or second set of wheels). In other example systems, the system may have any other means of traversing through the field.

In some configurations, the farming machine 100 additionally include a verification mechanism 150 that functions to record a measurement of the ambient environment of the farming machine 100. The farming machine may use the measurement to verify or determine the extent of plant treatment. The verification mechanism 150 records a measurement of the geographic area previously measured by the detection mechanism 110. The verification mechanism 150 records a measurement of the geographic region encompassing the plant treated by the treatment mechanism 120. The verification mechanism 150 measurement can additionally be used to empirically determine (e.g., calibrate) treatment mechanism operation parameters to obtain the desired treatment effect. The verification mechanism 150 can be substantially similar (e.g., be the same type of mechanism as) the detection mechanism 110 or can be different from the detection mechanism 110. In some embodiments, the verification mechanism 150 is arranged distal the detection mechanism 110 relative the direction of travel, with the treatment mechanism 120 arranged there between, such that the verification mechanism 150 traverses over the geographic location after treatment mechanism 120 traversal. However, the mounting mechanism 140 can retain the relative positions of the system components in any other suitable configuration. In other configurations of the farming machine 100, the verification mechanism 150 can be included in other components of the system.

In some configurations, the farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be separate from the system (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100. The control system 130 controls operations of system components of the farming machine 100 to take field actions and may include any of the other components, mechanisms, networks, and sensors previously described in relation to FIGS. 1A-B.

In some configurations, the farming machine 100 may additionally include a communication apparatus, which functions to communicate (e.g., send and/or receive) data between the control system 130 and a set of remote devices. The communication apparatus can be a Wi-Fi communication system, a cellular communication system, a short-range communication system (e.g., Bluetooth, NFC, etc.), or any other suitable communication system.

In addition to the components discussed above, the farming machine 100) may use treatment mechanisms coupled to a tiller of the farming machine to complete various field actions, for example tilling, spraying, or otherwise treating a plant or portion of the field.

Figure 1D:
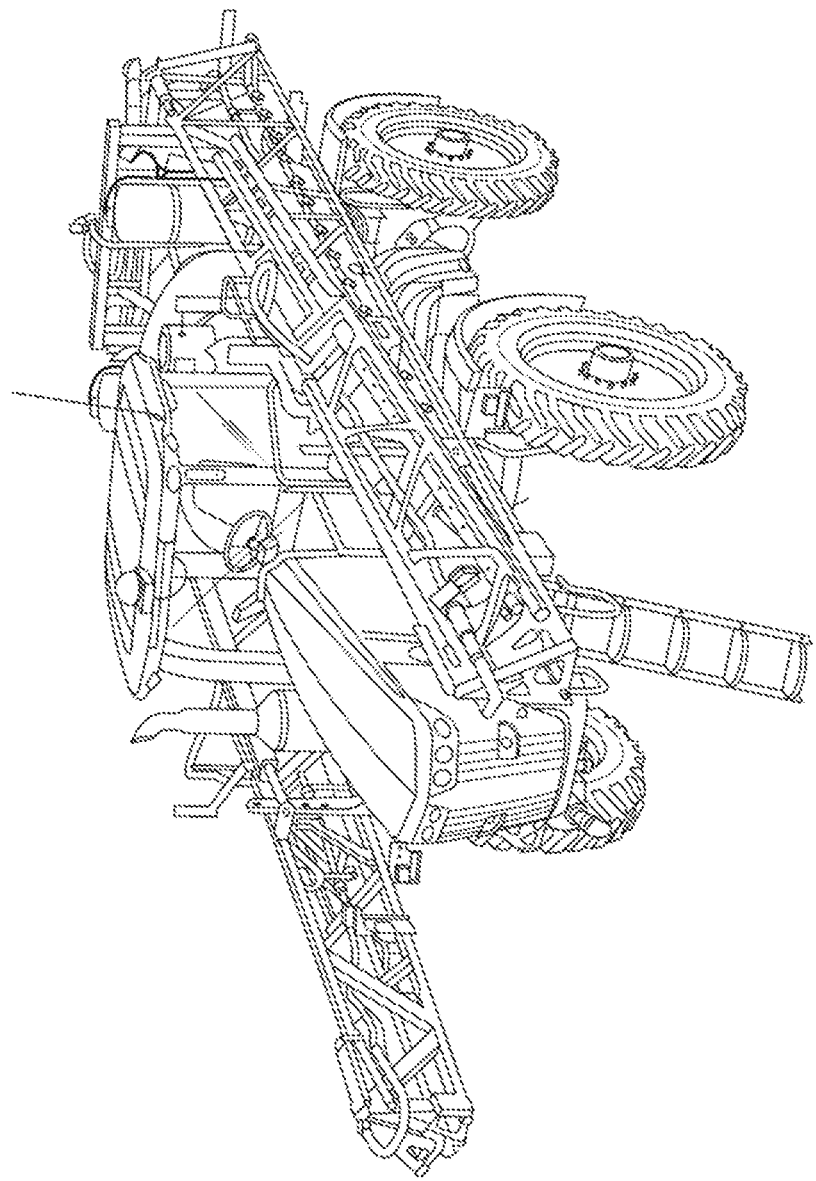
FIG. 1D illustrates a perspective view of a farming machine with two mounting mechanisms in a folded configuration, in accordance with an example embodiment.

FIG. 1D illustrates a perspective view of a farming machine 100 with two mounting mechanisms in a folded configuration, in accordance with an example embodiment. Each mounting mechanism 140 folds along a lateral axis such that detection mechanisms 110 attached to the mounting mechanism 140 face the farming machine 100 itself. In the illustrated folded configuration, a part of the side of the farming machine 100 is captured in the field of view of each detection mechanism 110. The arrangement of detection mechanisms 110 may be uniform across each mounting mechanism 140 or may be arranged in a particular configuration depending on the terrain of the area through which the farming machine 100 is navigating.

II.B. Array of Detection Mechanisms

Figure 2:
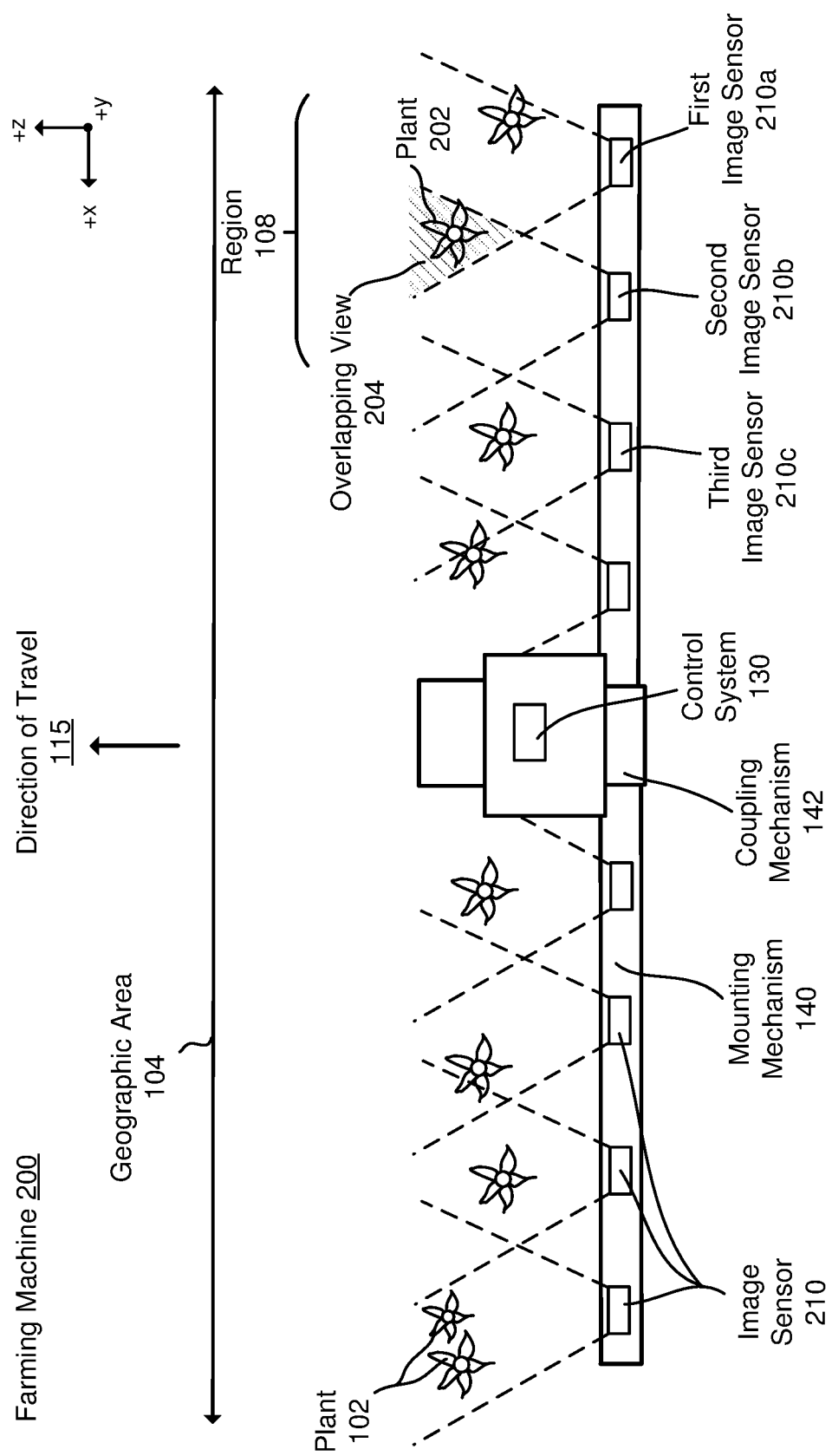
FIG. 2 illustrates a top view of a mounting mechanism with an array of image sensors, in accordance with an example embodiment.

FIG. 2 illustrates a top view of a mounting mechanism 140 with an array of image sensors, in accordance with an example embodiment. As illustrated in FIG. 2, the mounting mechanism 140 of the farming machine 200 is positioned in an unfolded configuration. Image sensors 210 are embodiments of the detection mechanism 140 that are configured to capture visual information, for example images. In the illustrated embodiment of FIG. 2, each image sensor 210 is oriented to face downwards towards the ground below the mounting mechanism 140. As the farming machine 200 navigates forward in the direction 115, each image sensor 210 captures images of plants 102 and other aspects of the geographic area 104 that lies within the field of view of the image sensor 210. In FIG. 2, the field of view of each image sensor 210 is illustrated using dashed lines.

As illustrated, the first image sensor 210a and the second image sensor 210b have an overlapping view of 204 a part of the region 108 that includes the plant 202, but the plant 202 need not be included. The overlapping view 204 is illustrated in FIG. 2 using diagonal crosshatching. Accordingly, the first image sensor 210a and second image sensor 210b will each capture an image that includes the plant 202 and any other features located in a region within the overlapping view 204. The position and orientation of the first image sensor 210a relative to the second image sensor 210b (and vice versa) may be determined based on visual information captured by each sensor 210 that represents features located in the region within the overlapping view 204. Although not shown in FIG. 2, the dirt or gravel in the region in the overlapping field of view 204 are additional external features extracted from images captured by the first image sensor 210a and the second image sensor 210b. Based on the position and orientation information extracted for each image sensor 210a and 210b, a calibration system determines a relative pose for the pair of sensors 210a and 210b. The calibration system is further discussed with reference to FIG. 3. If the relative pose indicates that the first image sensor 210a is rotated, shifted, otherwise incorrectly offset from the second image sensor 210b (relative to an expected offset), the difference between the two sensors 210 is identified as a calibration error.

The relative pose and calibration error determined for the first pair of image sensors 210a and 210b may provide a basis for calibrating other image sensors 210 on the mounting mechanism 140. For example, the calibration system may treat the third image sensor 210c and the second image sensor 210b as a second pair of sensors. The third image sensor 210c is positioned immediately adjacent to the second image sensor 210b such that the field of view of the third image sensor 210c overlaps with the field of view of the second image sensor 210b. Because of their adjacent positions on the mounting mechanism 140, the calibration system will treat the third image sensor 210c and the second image sensor 210b as a second pair of sensors.

Using visual information captured by the second pair of sensors 210b and 210c, the calibration system determines a relative pose between the second image sensor 210b and the third image sensor 210c. By comparing the relative pose between the first pair of sensors (e.g., the first image sensor 210a and the second image sensor 210b) and the second pair of sensors (e.g., the second image sensor 210b and the third image sensor 210c), the calibration system can confirm that third image sensor 210c is positioned immediately adjacent to the second image sensor 210b.

The steps described above may be repeated for a third pair of sensors that includes the third image sensors 210c and a fourth image sensor 210 positioned adjacent to the third image sensor 210c. The third image sensor 210c and fourth image sensor 210 create a third pair of image sensors and so on for any additional image sensor(s) on the mounting mechanism 140. Thus, the calibration error may be propagated across pairs of cameras 210 adjacently positioned on the mounting mechanism 140.

Additionally, the calibration error for a first pair of sensors 210a and 210b may be used to determine the relative pose between a second, adjacent pair of sensors 210. For example, in some embodiments, the calibration error for the first pair of sensors may be used to determine the calibration error for the second pair of sensors. Similarly, the calibration error determined for the second pair of sensors 210 may affect the calibration error determined for a third pair of sensors 210 positioned adjacent to the second pair of sensors and so on for each pair of sensors on the mounting mechanism. In this way, the calibration error for a first pair of sensors may be propagated, or distributed, across pairs of sensors adjacently positioned on the mounting mechanism.

In the described implementation of FIG. 2, the calibration error determined for the first pair of sensors is propagated in a single direction across pairs of image sensors extending from the first pair of sensors to a second pair of sensors on the opposite end of the mounting mechanism 140. In alternate embodiments, the first pair of sensors may be positioned at a center of a mounting mechanism 140 or another position between the center of the mounting mechanism and an end of the mounting mechanism 140. In such embodiments, the calibration error may be propagated across pairs of sensors on both sides of the first pair of sensors. For example, using the techniques discussed above, a calibration system may identify a calibration error for a first pair of sensors including a first image sensor 210a and a second image sensor 210b. The calibration system may propagate the identified calibration error in one direction when determining the calibration error for a second pair of sensors that includes the first image sensor 210a and an adjacent third image sensor 210c. The calibration system may also propagate the identified calibration in the opposite direction when determining the calibration error for a third pair of sensors that includes the second image sensor and an adjacent fourth image sensor. Calibration error propagation is further discussed below with reference to FIG. 3.

In an alternate embodiment, a calibration error(s) may be identified by applying the techniques discussed above to compare the relative poses of one or more pairs of image sensors. In such an embodiment, the relative poses of each pair of sensors may be chained and the calibration error(s) for the array of sensors may be determined by applying regression or finite element techniques to the change of poses.

In one embodiment, the position of an image sensor 210 on the mounting mechanism 140 may be determined based on information associated with a processor operating the image sensor. In one embodiment, a processor operating the first image sensor 210a may be assigned a hardware address identifying a global position of the first image sensor 210 on the farming machine. The hardware address may be extracted from a virtual representation of the farming machine 100 such as a CAD representation or any alternate configuration file. As described herein, a global position of a camera refers to a location of camera within a coordinate system representing the farming machine. Alternatively, the position of an image sensor 210 on the mounting mechanism 140 may be extracted from an alternate ID of the processor associated with the camera. In yet another embodiment, discussed further with reference to FIGS. 5A-C, the position of an image sensor on the mounting mechanism may be determined based on internal characteristics extracted from images captured during a folded calibration.

II.B System Environment

Figure 3:
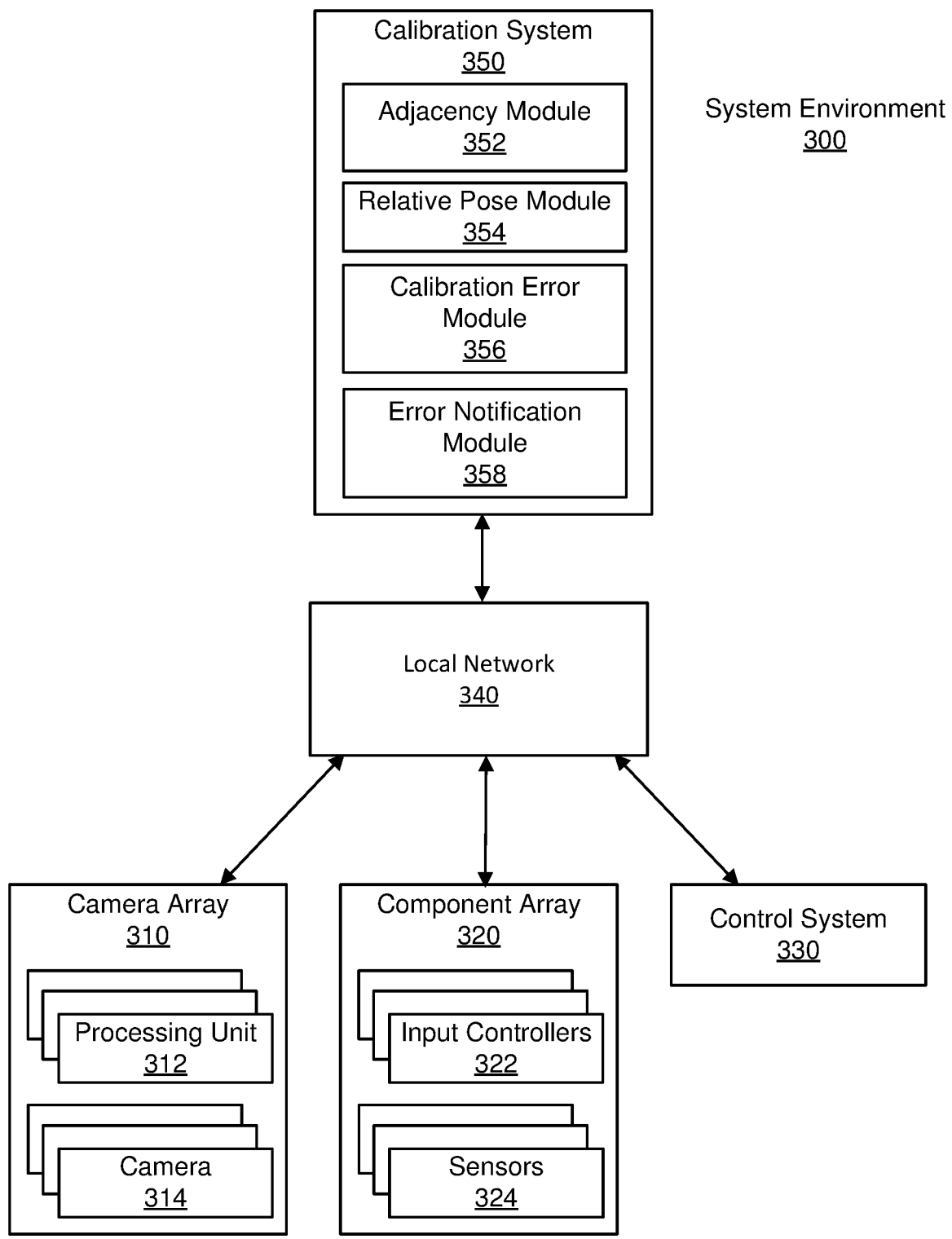
FIG. 3 is a block diagram of a system environment of a farming machine, in accordance with an example embodiment.

FIG. 3 is a block diagram of the system environment 300 for the farming machine 100, in accordance with an example embodiment. In FIG. 3, the camera array 310, the component array 320, and the control system 330 are components mounted on the farming machine 100 that are communicatively coupled by the local network 340.

The camera array 310 is a set of cameras 314 mounted to the mounting mechanism 140 and one or more processing units 312 configured to operate and manage the cameras 314. The cameras 314 are embodiments of an image sensor 210 and, more generally, a detection mechanism 110. Each camera 314 captures visual information of the environment (e.g., a field) around the farming machine 100 or even the farming machine 100 itself. Although described herein as cameras, a person having ordinary skill in the art would recognize that the functionality of the cameras 314 may be replaced with any alternate image sensor or detection mechanism.

A processing unit 312 may be a virtual processing unit. In some embodiments, the camera array 310 is configured with modularity such that each processing unit 312 operates and manages a single camera 314. For example, each processing unit 312 processes images and visual data captured by a particular camera 314 of the camera array 310. In alternate embodiments, a processing unit 312 is configured to operate multiple cameras 314.

The captured visual information may be sent to the control system 330 via the local network 340, for example to actuate the farming machine 100 to perform treatment functions. Alternatively, the captured visual information may be stored or processed by other components of the environment 300. In some embodiments, images captured by the camera array 310 may be manually transferred to the control system 330 via the network 340 or any other data-communication mechanism. Furthermore, in some embodiments, the camera array 310 may employ integrated processing to stitch together visual information captured from multiple cameras 314, or to perform image processing functions such as zooming, panning, de-warping, or other functions. In some embodiments, an individual processing unit 312 processes images captured by multiple cameras or may transmit an image to another processing unit for processing. Accordingly, processing unit 312 may process images captured by the cameras 314 positioned in varying arrangements.

The component array 320 includes components of the farming machine that perform functions of the farming machine, for example plant treatment, based on data collected by the camera array 310. Each component of the component array 320 includes an input controller 322 and a sensor 324. An input controller 322 receives machine commands via the local network 340 and actuates the component of the component array 320. A sensor 324 generates measurements representing a configuration of the component of the component array 320. In embodiments where the farming machine 100 is configured with modularity, each individual pair of processing units 312 and cameras 314 may be coupled to an individual component of the component array 320. In such modular implementations, visual information captured by a particular camera 314 is analyzed by an associated processing unit 312, which communicates machine commands to actuate a particular component 322, for example a treatment mechanism actuated to dispense a treatment fluid.

The control system 330 is an embodiment of the control system 130 discussed with reference to FIGS. 1A and 1B. The control system 330 may also be communicatively connected to a plurality of mobile devices via a network 340. An operator may interact with the control system 330 to send communication to and receive communications from such mobile devices. For example, an operator may prepare and communicate instructions for the control system to make operational adjustments to calibrate cameras 314 of the camera array 310.

The calibration system 350 analyzes visual information captured by the camera array 310 in order to calibrate poses of cameras 314 of the camera array 310, for example using the techniques described with reference to FIG. 2. The calibration system 350 is communicatively coupled to the camera array 310, the component array 320, and the control system 330 by the local network 340. For example, the calibration system 350, via the local network 340, receives visual information captured by the camera array 310, identifies calibration errors between pairs of cameras 314, and transmits instructions for remedying calibration errors to the control system 330. In alternate embodiments (not shown), the calibration system 350 is located at a remote server that is communicatively coupled to the camera array 310, the component array 320, and the control system 330 via a global network such as the Internet. The calibration system is further described below in Section III.

III. Calibration System

The calibration system 350 includes an adjacency module 352, a relative pose module 354, a calibration error module 356, an error notification module 358. The modules of the calibration system 350 act in concert to identify calibration errors in pairs of cameras mounted on the farming machine based on visual information captured by the farming machine 100 and generate instructions for addressing any identified calibration errors. In some embodiments, the control system 330 has more or different components than those shown in FIG. 3. In one embodiment, the components shown in FIG. 3 may be combined or removed. The functionality described herein with reference to the calibration system 350 may also be performed off-line, for example at a remote server or cloud database.

III.A Adjacency Module

The calibration system 350 calibrates cameras 314 of the array 310 on a pair-by-pair basis. To that end, the adjacency module 352 of the calibration system 350 identifies pairs of cameras that are adjacently positioned on a mounting mechanism 140. To identify a pair of cameras, the calibration system 350 begins with the assumption that cameras in the pair are adjacently positioned. In alternate embodiments, the calibration system 350 begins with the assumption the cameras are positioned at known locations on the mounting mechanism based on a virtual model of the farming machine, for example a CAD design, and the physical construction of the farming machine. Such virtual models may be stored at the calibration system 350 or any other suitable component of the system environment 300. Given that, the adjacency module 352 identifies a first camera 314 and a second camera 314, which is positioned adjacent to the first camera 314 on the farming machine. As discussed above with reference to FIG. 2, adjacent cameras 314 have an overlapping field of view, such that images captured by one camera will include external and internal features that also appear in images captured by the adjacent camera.

The adjacency module 352 extracts position and orientation characteristics for a pair of cameras by comparing visual information representing external and/or internal features that appear in images captured by both cameras of the pair. As described herein, visual information refers to the graphic content of the image, for example objects or features that are captured in the image. Visual information may include both internal characteristics of the farming machine and external characteristics of the surrounding area. Internal characteristics include, but are not limited to, parts of the farming machine itself and any design features, for example fiducials, placed or mounted on the farming machine. Visual information captured while the farming machine is parked may include such internal characteristics. External characteristics include, but are not limited to, portions of the area surrounding the farming machine, features in the area surrounding the farming machine, or parts of other machines in the surrounding area. Examples of features in the area surrounding the farming machine may include plants, soil, other machines, or other fiducial markers.

Turning now to calibration of adjacent cameras, in some embodiments, the calibration system 350 performs an initial calibration of the camera array 310 before the farming machine 100 begins navigating in an environment. In such embodiments, the adjacency module 352 analyzes visual information captured while the farming machine is parked. Here, the initial calibration is a folded calibration, but the initial calibration may also be an unfolded calibration depending on the configuration of the farming machine. During the initial calibration, the mounting mechanisms 140 of the farming machine are positioned such that the field of view of each camera 314 includes a side view of parts of the farming machine 100. Accordingly, the adjacency module 352 analyzes images with visual information representing internal features of the farming machine 100. Folded calibration is further described below with reference to FIGS. 5A-5C.

In one embodiment, the calibration system 350 calibrates the camera array 310 in real-time as the farming machine 100 navigates through the field and collects farming data. Here, the real-time calibration is an unfolded calibration, but real-time calibrations may also be folded calibrations depending on the configuration of the farming machine. During the real-time calibration, the mounting mechanisms 140 of the farming are positioned such that the field of view of each camera 314 includes a portion of the area in front of, behind, and/or surrounding the farming machine 100. Accordingly, during a real-time calibration, the adjacency module 352 analyzes images with visual information representing external features of the area surrounding the farming machine 100. Unfolded calibration is further described below with reference to FIGS. 6A-6C.

To perform a calibration, whether folded or unfolded, initial or real-time, the adjacency module 352 identifies a first camera of the array 310. The adjacency module 352 accesses visual information captured by a first camera 314 of the array 310 and extracts position and orientation characteristics of the first camera 314 from the accessed visual information. In some embodiments, the adjacency module 352 selects a first camera of a pair of cameras based on visual information representing features that describe a global position of the camera relative to the array 310 or, more generally, the farming machine 100. For example, when the mounting mechanism 140 is in the folded position, a camera 314 positioned on the far end of the mounting mechanism captures visual information containing the back end of the farming machine. Alternatively, when the mounting mechanism 140 is in the folded position, a camera 314 positioned in the middle of the mounting mechanism may capture visual information of the cab of the farming machine. During deployment of the farming machine 100 in an environment, fiducial markers in the environment may be used to inform the global position of a camera on the farming machine or the camera array 310. When used to determine the global position of a single camera of the camera array 310, fiducial markers in the environment may be georeferenced to inform the global position of the camera on the array 310.

When performing either a folded or an unfolded calibration, the adjacency module 352 determines a scale factor for each camera. In one embodiment, the adjacency module 352 determines a fixed scale factor based on the distance between a camera 314 and an adjacent camera 314. The distance between the camera 314 and the adjacent camera 314 may be determined from a virtual representation of the machine (e.g., a CAD file), a manufacturing specification, or a theoretical distance. In an alternate embodiment, the adjacency module 352 determines the scale factor based on the height of a camera 314 relative to the ground surface. In some embodiments, the height of a camera may be measured by a sensor mounted to the farming machine. In such an embodiment, the adjacency module 352 additionally identify visual features in images captured by the camera 314 and adjacent camera 314 characterizing the height of the respective camera 314. For example, the adjacency module 352 may additionally measure the depth of points in the image to determine a scale matching the stereo depth of the pair of cameras. In another embodiment specific to folded calibrations, the adjacency module 352 determines the scale factor of a camera 314 by comparing the known size of an object or fiducial on the farming machine within the field of view of the camera 314 in the folded configuration to target objects of a known scale.

Because adjacently positioned cameras have an overlapping field of view, the adjacency module 352 identifies a camera that is adjacent to the first camera as the second camera in the pair of cameras. When identifying the second camera 314, the adjacency module 352 may consider the global position of the first camera 314. Continuing from the example above, after determining that the first camera is positioned on the far end of the farming machine, the adjacency module 352 may identify a second camera positioned adjacently to the right (or to the left depending on position of the first camera in the array 310) of the first camera and a third camera positioned adjacently to the right of the second camera. Using the techniques discussed below, the calibration system 350 may determine the relative pose of a first pair of cameras including the first camera and the second camera and may determine the relative pose of a second pair of cameras including the second camera and the third camera.

In alternate embodiments, the adjacency module 352 identifies an adjacent camera (e.g., a second camera of a pair) by determining which camera 314 of the array 310 has an overlapping field of view with the first camera. To illustrate, consider, for example, the embodiment of a farming machine discussed above with reference to FIG. 2. Depending on the configuration and position of cameras on the camera array 310, the adjacency module 352 may identify more than two cameras as having an overlapping field of view and determine a relative pose for all cameras with the overlapping field of view. The adjacency module 352 may implement multi-view geometry techniques to identify multiple cameras having overlapping fields of view by connecting images of multiple views of the same region, whether a single camera capturing images of a region from different location or a multiple cameras capturing images of the same region. In some embodiments, the adjacency module 352 may both consider the global position of the first camera and identify the camera 314 with the overlapping field of view.

To determine if two cameras are adjacent, the adjacency module 352 identifies one or more features in visual information captured by a first of the two cameras and one or more features in visual information captured by the second of the two cameras. The adjacency module 352 may identify features in visual information captured by a camera 314 using any suitable technique including, but not limited, a feature recognition algorithm such as scale-invariant feature (SIFT) transform techniques, speeded up robust feature techniques, or oriented FAST and rotated BRIEF techniques. The adjacency module 352 further determines the pose between the two cameras by determining a matrix of matching points between images captured by the two cameras and estimating a pose, modulo a scale factor, between the two cameras. The adjacency module 352 additionally performs an outlier rejection over multiple poses to identify a most accurate and robust relative pose between the two cameras. In one embodiment, the adjacency module 352 implements RANSAC routines to randomly sample a subset of potential poses and determine an average pose from the randomly sampled subset. The average pose may be determined using a singular value decomposition (SVD) technique. The adjacency module 352 uses the average of the average pose to identifier inliers (e.g., other poses within a threshold distance of the average pose) and rejects outliers (e.g., other poses beyond a threshold distance from the average pose). Accordingly, the pose selected after such an outlier rejection is a combination of the pose with the most inliers and the pose with the lowest residuals (e.g., the root squared error between each inlier and the average pose). Although the calibration error may be determined based on a weighted combination of translation error and rotation error, the calibration system 350 may determine an angular error based on the average pose and subsequently determine a translational error.

In alternate embodiments, the adjacency module 352 may determine the pose of a camera (or pair of cameras) relative to a fiducial, for example using Aruco patterns, Charuco targets, or QR codes. In such embodiments, the adjacency module 352 computes a pose of a camera relative to a target for each camera (e.g., a fiducial) and determines a pose between the two cameras based on a scale factor.

If one of the identified features is positioned in an area within the overlapping field of view, it will be identified in the visual information captured by both the first camera and the second camera. Because the same feature is identified in the field of view of both cameras, the adjacency module 352 can confirm that the two cameras are adjacent. In some embodiments, the adjacency module preferentially analyzes visual information captured by cameras that have been assigned some indicator of their adjacency. For example, the adjacency module 352 may begin by analyzing visual information captured by two cameras that were determined to be adjacent during a previous calibration of the camera array 310. As another example, the adjacency module 352 receives a suggestion from an operator that a first camera and a second camera may be adjacent. In either example, the adjacency module 352 accesses visual information captured by each camera and applies the techniques discussed above to identify any matching features present in the visual information captured by each camera.

In alternate embodiments where the adjacency module 352 identifies adjacent pairs of cameras without any prior insight, the adjacency module 352 may apply the techniques discussed above to identify features in visual information captured by each remaining camera 314 of the camera array 310. The adjacency module 352 determines if any features identified from visual information captured by the remaining cameras 314 of the array 310 match the features identified from the visual information captured by the first camera 314. If the adjacency module 352 identifies a camera that captured visual information including at least one common feature, the adjacency module 352 may determine that the identified camera is adjacent to the first camera. In one embodiment, the adjacency module 352 identifies multiple common features, for example 10 common features, before identifying an adjacent pair of cameras. The adjacency module 352 may additionally consider whether the requisite number of common features is stable over a threshold amount of successive images, for example more than 60% of successive images.

To assist in identifying adjacent cameras, the adjacency module 352 may read timestamps assigned to visual information captured by the camera array 310. As described herein, a timestamp describes when the visual information was captured by a camera 314 of the camera array 310. Given a timestamp at which a first camera captured an image, the adjacency module 352 accesses visual information captured by other cameras of the camera array 310 at the same timestamp. The adjacency module 352 analyzes the accessed visual information to identify another camera that captured visual information including at least one feature identified in visual information captured by the first camera. The timestamp during which images are considered may be defined manually by an operator supervising the calibration of the camera array 310 or may be defined based on visual information most recently captured by the camera array 310. In alternate embodiments, timestamps may be triggered automatically on a periodic basis. By considering images captured at a particular timestamp, the adjacency module 352 may improve the processing and computing efficiency with which it identifies a pair of adjacent cameras.

In addition to or in place of the timestamp techniques described above, the calibration system 350 may monitor the speed of the farming machine and only analyze images captured by the camera array 310 while the machine is in motion. The calibration system 350 may additionally store a sequence of images for processing when the machine has stopped moving. Accordingly, when the machine stops or performs a turn while not dispensing treatment fluid, the calibration system 350 may perform calibration techniques based on previously captured images or images taking while machine has stopped or is turning.

In some embodiments, the adjacency module 352 identifies a second camera of a pair of cameras based on the hardware address of a processing unit 312 operating the first camera 314. In such embodiments, the adjacency module 352 identifies a second processing unit 312 that is assigned a hardware address adjacent to the hardware address of the processing unit 312 operating the first camera and identifies the camera being operated by the second processing unit 312 as the second camera of the pair. In such embodiments, the adjacency module 352 modifies the virtual representation or configuration file to improve the accuracy of spray commands and visualization techniques for the calibration system, for example stitching images describing the location of plants and locations to be treated.

If the camera operated by the second processing unit 312 with the adjacent hardware address (e.g., the second camera of the pair) captures an image that does not contain any of the features identified in the image captured by the first camera, the adjacency module 352 may detect a hardware error indicating that the second camera associated with the adjacent hardware address does not have an overlapping field of view with the first camera. For example, an incorrectly wired processing unit 312 may cause the adjacent hardware address to be assigned to the incorrect camera 314. In such implementations, the adjacency module 352 communicates the detected error between the first and second cameras to the error notification module 358. The adjacency module 352 may further search visual information captured by every other camera of the camera array 310 to identify a camera of the camera array 310 that does have an overlapping field of view with the first camera. If a third camera of the camera array 310 is identified as having an overlapping field of view with the first camera, the notification communicated by the error notification module 358 to a human operator may identify the first camera and the third camera as being an adjacent pair of cameras. Alternatively, the notification may indicate that the first camera and the third camera are candidates for an adjacent pair of cameras and request that a human operator manually confirm that the first and third cameras are actually adjacent. The notification may instruct the operator to re-wire the first and third cameras and the corresponding processing units to reflect their adjacency. Alternatively, the adjacency module 352 may modify the configuration file, or virtual model of the farming machine, to rearrange the hardware addresses of the first and third cameras to reflect their actual positions on the mounting mechanism.

In some embodiments, the adjacency module 352 identifies the second camera of the pair by considering both visual information captured by camera array 310 and hardware addresses assigned to processing units 314 operating cameras 314 of the camera array 310. For example, instead of searching images captured by every camera of the camera array 310 for features identified in the first image as discussed above, the adjacency module 352 only searches an image captured by a camera operated by a processing unit 312 with an adjacent hardware address.

III.B Relative Pose Module

For a pair of adjacent cameras, the calibration system 350 determines a relative pose between the cameras to identify a calibration error(s) between the cameras of the pair. As described herein, a calibration error for a pair of cameras identifies a misalignment between the pair. As discussed above, because the fields of views of adjacent cameras 314 overlap, a calibration error for a pair of adjacent cameras 314 may be identified based on position and orientation characteristics extracted from visual information captured by the pair of cameras. Thus, a relative pose between the cameras defines a relative difference in position and orientation between the cameras that can indicate whether the pair of cameras are aligned or misaligned.

To provide some additional context, when a pair of cameras are correctly aligned, features appearing in visual information captured by both cameras will also appear aligned. Examples of aligned cameras include, but are not limited to, cameras angled at the same orientation, cameras positioned at the same height relative to a ground surface, cameras positioned in the same vertical and horizontal plane, or a combination thereof. In comparison, when a pair of adjacent cameras are misaligned, features appearing in visual information captured by both cameras will also appear misaligned. Examples of misaligned cameras include, but are not limited to, cameras angled at different orientations, cameras positioned at different heights relative to the ground surface, cameras positioned in different vertical and/or horizontal planes, or a combination thereof.

Within this framework, a relative pose can relate a degree of alignment or misalignment between the two cameras. Therefore, the relative pose module 354 determines the relative pose between the pair of cameras to characterize the alignment between the two cameras. In terms of relative pose, two cameras are aligned if the pose of a first camera is aligned with the pose of a second camera. In some embodiments, two cameras may be aligned when the position and orientation of the first camera mirrors the position and orientation of the second camera. In one embodiment, the first camera may be intentionally positioned at a vertical offset relative to the second camera (e.g., different heights relative to a ground surface). In such embodiments, the two cameras are aligned if the orientation of the first camera mirrors the orientation of the second camera and the offset between the first and second camera matches the intended offset. In one embodiment, the positioning or offset of the two cameras may not be considered when evaluating determining the relative pose. In such embodiments, two cameras may be aligned when the orientation of the first camera mirrors the orientation of the second camera.

In comparison, two cameras may be misaligned if the pose of the first camera differs from the pose of the second camera. For example, two cameras may be misaligned, if the orientation of the first camera does not match the orientation of the second camera, the position of the first camera is incorrectly offset from the position of the second camera, or a combination thereof.

The relative pose module 354 may model the alignment (e.g., the relative pose) between two cameras by comparing the position of a feature in visual information captured by a first camera to the position of the same feature in visual information captured by the second camera. To that end, the relative pose module 354 extracts the position and orientation of each camera of the pair based on the position one or more features that appear in visual information captured by both cameras of the pair. For example, when a pair of cameras are aligned, the position of features in visual information captured by the first camera may mirror the position of features in visual information captured by the second camera. As another example, if a first camera of the pair is positioned at a vertical offset relative to the second camera, a feature in visual information captured by the first camera will also appear offset compared to the same feature in visual information captured by the second camera. The relative pose module 354 may analyze visual information captured by cameras 314 and identify features in visual information using the same techniques discussed above with regards to the adjacency module 352.

Based on features identified in visual information captured by a first camera and a second camera, the relative pose module 354 determines a relative pose for the two cameras up to a scale factor. In one embodiment, the relative pose module 354 determines a fixed scale factor based on the distance between a camera 314 and an adjacent camera 314. In an alternate embodiment, the relative pose module 354 determines the scale factor based on the height of a camera 314 relative to the ground. In another embodiment specific to folded calibrations, the relative pose module 354 determines the scale factor of a camera 314 by comparing the known size of an object or fiducial on the farming machine within the field of view of the camera 314 in the folded configuration to target objects of a known scale.

The relative pose module 354 compares the relative pose determined between the first camera and the second camera to the configuration file or virtual model that describes the design, placement, position, and orientation of the cameras. When the relative pose determined between two cameras differs from the pose prescribed by the configuration file or the virtual CAD model, a calibration error exists between the two cameras. Calibration errors are further discussed below in Section III.C.

To determine the relative pose between a pair of cameras, the relative pose module 354 determines a number of features that appear in both visual information captured by the first sensor of the pair and visual information captured by the second sensor of the pair. If the number of features that appears in both images is greater than a threshold number, the relative pose module 354 may compare the position and orientation of those features in the first and second image to determine the relative pose between the first and second camera.

In some embodiments the relative pose of a pair of cameras is determined based on ground-based fiducial targets, for example Charuco targets laid out underneath the extended manifold. In such embodiments, the relative pose module 354 determines the pose of a camera relative to a Charuco target of a known size and with known feature locations and determines the relative pose between two camera based on a known scale factor (e.g., a scale factor determined using the techniques discussed above). In addition to Charuco patterns, the relative pose module 354 may determine a relative pose based on any other suitable pattern or coded target, for example QR codes, Aruco codes.

Using the relative pose of a first pair of cameras, the relative pose module 354 may determine the relative pose of other pairs of cameras adjacent to the first pair. Recall the example embodiment illustrated in FIG. 2. The first pair of cameras includes a first camera and a second camera. A second pair of cameras includes the second camera and a third camera positioned adjacent to the second camera. Due to their adjacency, the relative pose module 354 may determine the relative pose for the second pair of cameras based on the relative pose determined for the first pair of cameras. These steps may be repeated for a third pair of cameras that includes the third camera and a fourth camera positioned adjacent to the third camera and so on across all cameras of the camera array 310. In this manner, the relative pose of the first pair of cameras may be propagated across all adjacent pairs of cameras of the array 310 so that each pair of cameras is aligned with the other pairs of the camera array 310.

In an embodiment where the visual information captured by a first camera represents a particular part of the farming machine and visual information captured by a second camera also represents the particular part of the machine, the relative pose module 354 determines the relative pose between the first and second cameras by extracting relative position and orientation characteristics of the particular part from visual information captured by both the first camera and the second camera. In an alternate embodiment, the relative pose module 354 determines the relative pose between a first camera and a second camera by extracting position and orientation information from a fiducial marker in a portion of the area surrounding the farming machine 100 in visual information captured by the first camera and visual information captured by the second camera. In some embodiments, the relative pose module 354 determines the relative pose between a pair of cameras using a probabilistic fitting algorithm to estimate the alignment of one camera of the pair relative to the farming machine itself. In some embodiments, the relative pose module 354 determines the relative pose between a pair of cameras using a least-squares fitting algorithm or any other suitable algorithm that considers and iteratives over different sets of visual features.

In some embodiments, the first camera of a pair may capture visual information at a different resolution, field of view (e.g., a wider or narrower lens), zoom factor, or magnification than the second camera of the pair, causing features in visual information captured by the first camera to appear smaller or larger than they do in visual information captured by the second camera. Accordingly, the relative pose module 354 may determine a correction factor for the first camera, the second camera, or both to standardize the dimensions of features appearing in visual information captured by both cameras of the pair. As described herein, a correction factor quantifies a relationship between a distance (e.g., a distance between two features) in visual information captured by a camera and the actual distance (e.g., an actual distance between two features) in the environment surrounding the farming machine 100. The actual distance between the two features may be measured by a sensor mounted to the farming machine. The relative pose module 354 may determine the relative pose based, at least in part, on the correction factors determined for one or both cameras of the pair.

In addition to visual information, the relative pose module 354 may also consider configuration parameters of cameras including, but not limited to, a height of the camera relative to the ground surface and an angle relative to the ground surface. The relative pose module 354 determines the relative pose between the pair of cameras based on position and orientation information extracted from a combination of visual information and configurational parameters. In a first embodiment, a sensor mounted to the farming machine measures a height of both cameras of a pair of cameras relative to a surface surrounding the farming machine, for example the ground. The relative pose module 354 determines the relative pose between the pair of cameras based, at least in part, on the relative height of the pair of cameras. In alternate embodiments, the height of the cameras may be determined relative to a plane of reference other than the surface of the ground.

Similarly, in a second embodiment, a sensor mounted to the farming machine measures an angle of both cameras of a pair of cameras relative to a surface surrounding the farming machine, for example the ground. The relative pose module 354 determines the relative pose between the pair of cameras based, at least in part, on the relative angle of the pair of cameras. In alternate embodiments, the angle of the cameras may be determined relative to a plane of reference other than the surface of the ground.

III. C Calibration Error Module

The calibration error module 356 identifies a calibration error based on the relative pose between the pair of cameras determined by the relative pose module 354. For example, if the relative pose between two cameras 314 indicates that one camera of the pair is tilted at an angle relative to the other properly oriented camera, the calibration error module 356 identifies the angle of the titled camera as a calibration error. As another example, if the relative pose between two cameras 314 indicates that one camera is positioned at a vertical offset relative to the other camera, the calibration error module 356 identifies the vertically offset camera as a calibration error. In one embodiment, the calibration error module 356 may access a digital model of the farming machine that includes an actual pose between the pair of cameras. The digital model may be a virtual representation of the farming machine 100 representing a set of parameters describing the offset between cameras in the three dimensions (roll, tilt, and yaw). The calibration error module 356 compares the relative pose between the pair of cameras to the actual pose in the digital model to determine the calibration error for the pair of cameras The techniques discussed above identify calibration errors in the relative pose between two cameras but may not identify which of camera of the pair is out of alignment. In some embodiments, the calibration error module 356 generates a notification for an operator to inspect and manually resolve the error between the two cameras. In one embodiment, the calibration error module 356 identifies the particular misaligned camera by comparing the relative pose between the pair of cameras to the relative pose between each camera and an additional adjacent camera. For example, a camera array 310 includes a first camera, a second camera, a third camera, and a fourth camera in that order and the calibration error module 356 identifies a calibration error between the second and third camera. The calibration error module 356 determines the relative pose between the first camera and the second camera and also identifies a calibration error between the first and second camera. Additionally, the calibration error module 356 determines the relative pose between the third camera and the fourth camera and does not identify a calibration error between the third camera and the fourth camera. Accordingly, the calibration error module 356 concludes that the second camera is misaligned rather than the third camera.

In some embodiments, the calibration error determined for a first pair of cameras may be propagated across other pairs of cameras of the array 310. As discussed above, the adjacency module 352 identifies a pair of individually adjacent cameras of the camera array 310. To propagate a calibration error determined for a first pair of cameras across other pairs of cameras, the calibration error module 356 identifies pairs of cameras that are adjacent to the first pair. By comparing the relative pose determined for a first pair of cameras to a relative pose determined for a second pair of cameras, the calibration error module 356 determines whether the second pair of cameras is adjacent to the first pair of cameras. For example, the first pair of cameras may include a first camera and a second camera. The second pair of cameras may include a second camera and a third camera. By comparing the relative pose of the first pair of cameras with the relative pose of the second pair of cameras, the calibration error module 356 determines that the second camera is adjacent to both the first camera and the third camera and updates the calibration error determined for the first pair of cameras based on the relative pose of the second pair of cameras. This process may be repeated with a third pair of cameras including the third camera and a fourth camera to continue propagating the calibration error across the camera array 310 and so on.

In embodiments where the calibration error module 356 determines that two pairs of cameras are not adjacent, the calibration error module 356 will not propagate the calibration error to the second pair of cameras. Instead, the calibration error module 356 may search the remaining pairs of cameras of the camera array 310 an adjacent pair of cameras using the techniques discussed.

In some embodiments, the calibration error module 356 may identify cameras 314 that represent boundaries or other applicable points along the camera array 310. As described herein a camera representing a boundary of the camera array 310 is a camera positioned at an end of the camera array 310. For example, the calibration error module 354 identifies cameras positioned at the ends of the mounting mechanism 140 as representing the boundaries of the camera array 310. The calibration error module 356 may identify cameras positioned at the ends of the mounting mechanism 140 using any of the techniques discussed above for determining the global position of a camera. The calibration error module 356 constrains the propagating of a calibration error within the farming array 310 by sequentially propagating the calibration error determined for a pair of cameras to the cameras positioned on either end of the camera array 310. In one embodiment, the error propagation is constrained to cameras in a particular region of the camera array 310. In such embodiments, the calibration error module 356 identifies cameras positioned at either end of a particular region of the camera array 310 and propagates the calibration error determined for a pair of cameras within the particular region across all other pairs of cameras within the particular region.

In an alternate embodiment, the calibration error module 356 distributes a calibration error across a camera array 310. Using the techniques discussed above, calibration error module 356 identifies a first camera at one end of the array 310 and a second camera at the other end of the array 310. The calibration error module 356 additionally considers the calibration error of each pair of cameras between the first and second cameras to determine whether the first camera 310 and the second camera 320 are aligned with each other. If the cameras on each end are misaligned, the calibration error module 356 may determine the total calibration error between the two and distribute that error across all cameras of the camera array 310, for example by making minor adjustments to the relative pose of each camera of the array 310 to align the cameras at either end of the array 310 into alignment. The calibration error module 356 may adjust the orientation of each camera of the array 310 to align the first and second cameras within a minimal error of each other.

III.D Error Notification Module

Based on the calibration error determined for a pair of cameras, the error notification module 358 generates a notification with instructions for an operator to remedy the calibration error. The calibration error may be remedied by adjusting the position and orientation characteristics of at least one camera of the pair of cameras. For example, if a first camera of a pair of cameras is correctly oriented and positioned, but the second camera of the pair is tilted at an angle, the error notification may include instructions for adjusting the orientation of only the second camera. Alternatively, if a first camera of a pair of cameras is slightly tilted from the correct orientation and the second camera of the pair is even more tilted from the correct orientation the error notification may include instructions for adjusting the orientation of one or of the cameras or both.

In embodiments, where the calibration error has been distributed across multiple pairs of cameras of the camera array 310, the generated notification may include instructions for an operator to remedy the calibration error of at least one affected pair of cameras of the camera array 310. The calibration error may be remedied by adjusting the position and orientation characteristics of at least one camera of the affected pairs of cameras. For example, if a calibration error is distributed across a first pair of cameras involving a first camera and a second camera and a second pair of cameras involving the second camera and a third camera, an error notification may include instructions for most efficiently calibrating the alignment of all three cameras. If the first camera is aligned with the third cameras but not the second camera, the instructions may cause the orientation of the second camera to become aligned with the first and third camera.

In addition to adjusting the orientation of a camera involved in the calibration error, the instructions in the error notification may also include instructions for adjusting the position and offset of an uncalibrated camera, adjusting a setting of an uncalibrated camera, or any other suitable technique for calibrating an uncalibrated camera.

In embodiments where the calibration system 350 is unable to calibrate a pair of cameras, for example because insufficient common features are found between images captured by the pair of cameras, the error notification module 358 may describe the cause for why the calibration could not be performed and instructions for remedying the cause. Examples of such reasons include, but are not limited to, unclear images captured by either or both cameras, dust on the lens of a camera, an obstructed camera, darkness in the surrounding environment, an excess of vegetation in the surrounding environment, incorrectly wired cameras and processing units (as discussed above), or an insufficient amount of matching samples. In addition to the instructions for remedying the cause, the notification may also display images to the operator to guide them through resolving identified cause.

In some embodiments, the error notification module 358 transmits the generated error notification to an operator of the farming machine so that the operator can manually execute the instructions to remedy the calibration error. In such embodiments, the error notification 358 may provide a visualization of the error, for example an image presented to the operator. Such images may be annotated to display information regarding how the calibration error occurred such as a dark or blurry image or a highlighted region of the image identifying where the image was rotated from its desired orientation. In addition, or as an alternative, the image may display a graphical or three-dimensional representation of the camera to illustrate how the camera was tilted or misaligned. In one embodiment, the error notification module 358 transmits the error notification to the control system 330, where the control system 330 implements the instructions of the transmitted error notification to calibrate the uncalibrated camera 314 of the camera array 310.

IV. Process for Camera Calibration

FIG. 4 is a flowchart illustrating a method for calibrating pairs of cameras in an array of cameras, in accordance with an example embodiment. The steps of FIG. 4 may be performed by the calibration system 350 of the farming machine 100. However, some or all of the steps may be performed by other entities or systems, such as a construction machine. In addition, other embodiments may include different, additional, or fewer steps, and the steps may be performed in different orders.

From an array of cameras, the calibration system 350 identifies a pair of cameras mounted in adjacent positions on the farming machine. The calibration system 350 accesses 410 a first image captured by the first camera of the pair and a second image captured by the second camera. Because of their adjacent positions on the farming machine, the field of view of the first camera overlaps with the field of view of the second camera. Accordingly, an image captured by the first camera at a given timestamp includes features that are also present in an image captured by the second camera at the given timestamp if those features are positioned in the overlapping field of view between the two cameras. From each of the first and second images, the calibration system 350 extracts position and orientation characteristics for the camera that captured the image. For example, the orientation and position of features in the first image is representative of the orientation and position of the first camera itself.

The calibration system 350 determines 430 a relative pose for the pair of cameras including the first and second camera by comparing the extracted position and orientation characteristics of the first camera with those of the second camera. The calibration system 350 identifies 440 a calibration error for the pair of cameras based on the relative pose determined for the pair. The identified calibration error describes a deviation of one or both cameras of the pair from their correct alignment. The calibration system 350 transmits 450 a notification to an operator with instructions to remedy the calibration error by adjusting the position and orientation of at least one camera identified in the calibration error (e.g., one of the first or second cameras).

V. Example Folded Calibration

Figure 5A:
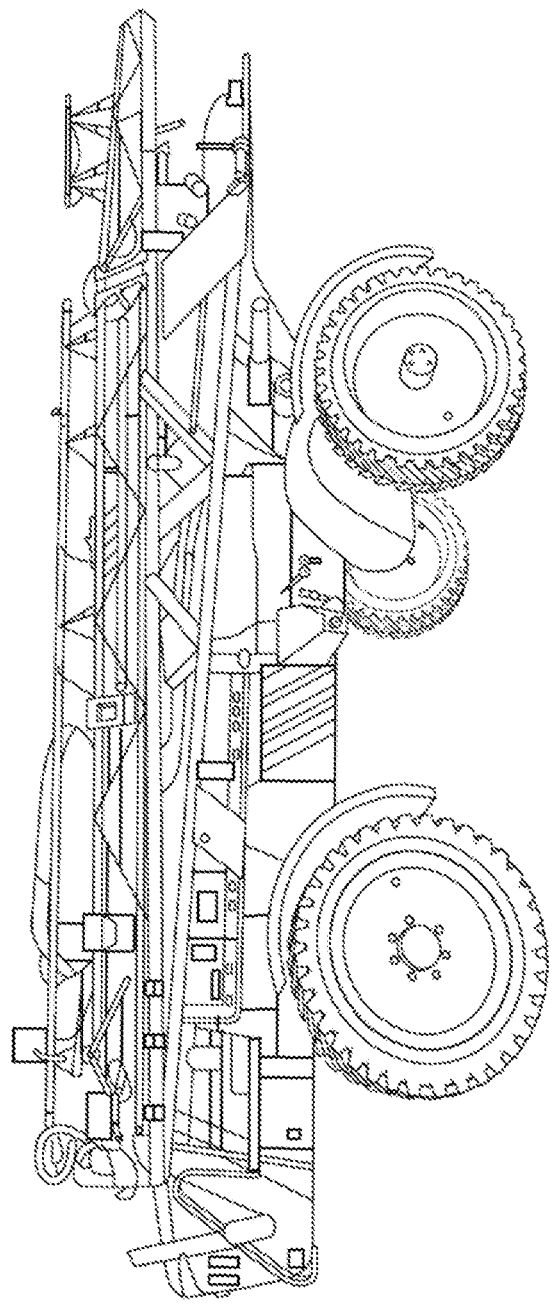
FIGS. 5A-C illustrate examples of a stationary farming machine performing a folded calibration, in accordance with an example embodiment.
Figure 5C:
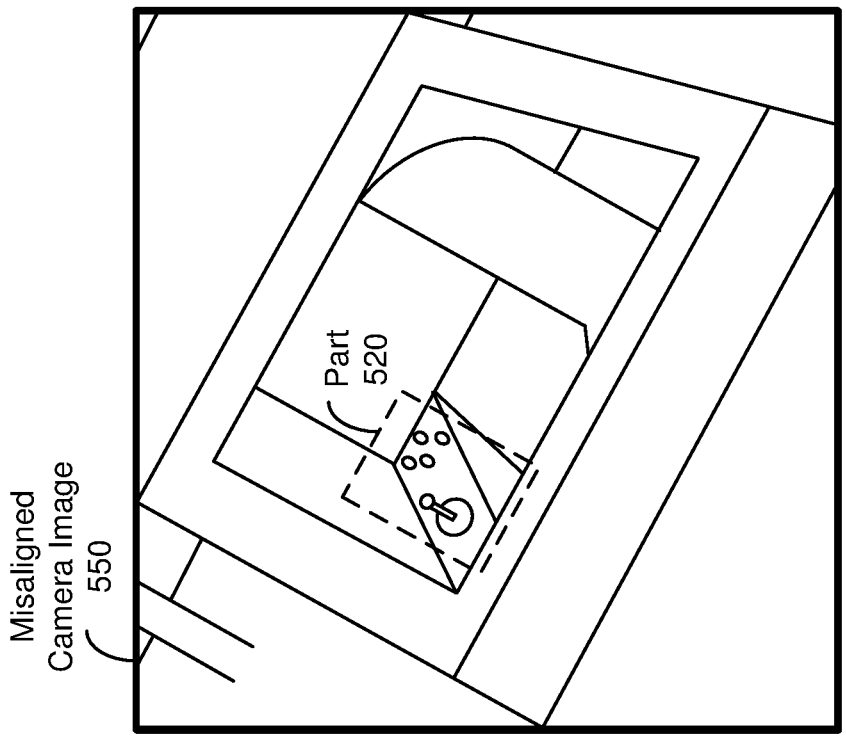
Figure 5B:
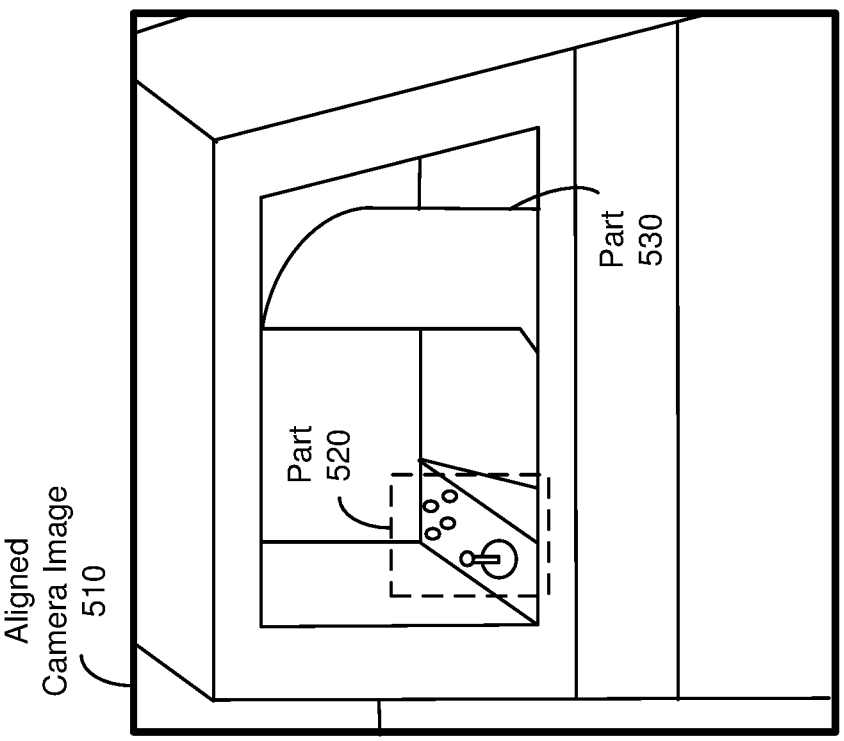

FIGS. 5A-C illustrate examples of a stationary farming machine 500 performing a folded calibration, in accordance with an example embodiment. FIG. 5A illustrates an example of a stationary farming machine 500 performing a folded calibration, in accordance with an example embodiment. In the illustrated embodiment (i.e., a folded configuration), the mounting mechanisms are folded inward towards the farming machine 500, such that the cameras mounted to the mounting mechanism are facing the farming machine itself. Accordingly, images captured by the cameras in this configuration capture images that include parts of the machine 500.

FIG. 5B illustrates an example of an image captured by a camera mounted on the farming machine, in accordance with an example embodiment. The camera image 510 is captured by a camera that is positioned and oriented in its proper alignment. As discussed above with reference to FIG. 3, the calibration system 350 performs a folded calibration of a camera array 310 based on images with visual information including parts of the farming machine. In FIG. 5B, visual information of the first camera image 510 identifies the part of the farming machine 520 (e.g., a control panel in a cab of the farming machine) and the part of the farming machine 530 (e.g., a chair in the cab of the farming machine). In the image, both parts 520 and 530 are in the correct orientation and position, so the position and orientation characteristics extracted from the first camera image 510 will indicate that the first camera is in the proper orientation and position.

In comparison, FIG. 5C illustrates an example of an image captured by the same camera mounted on the farming machine but in an incorrect orientation, in accordance with an example embodiment. Thus, the second camera image 550 also includes visual information that identifying the parts 520 and 530. However, in the image 550, the part 520 is not oriented in the upright position illustrated in the image 550. Thus, the position and orientation characteristics extracted from the second camera image 550 will indicate that the camera is also not oriented in the correct upright position described in FIG. 5B. Based on the differing orientations of the part 520 in the image 510 and the image 550, the orientation and position of the camera may be remedied remotely or manually by an operator before the mounting mechanisms are unfolded and the farming machine is deployed in a field.

In some embodiments, the calibration system 350 performs a folded calibration using fiducial markers located in an area surrounding the farming machine, for example within a factory housing the farming machine or at particular locations in a field such as a tendering station where the machine reloads chemicals or refuels.

Further, based on the internal features extracted from the image captured by the camera in the folded configuration, for example fiducials mounted to the farming machine or parts of farming machine 520 and 530, the relative pose module 354 may determine an actual position of the camera on the mounting mechanism or, more generally, the actual position of the camera in the global system of farming machine. Based on the extracted internal features, the relative pose module 354 may determine the position of a first camera relative to other components of the farming machine such as the treatment mechanisms 120 or the farming machine itself. Using the techniques discussed above for identifying adjacent cameras, the relative pose module 354 may use the determined position of the first camera to determine the global positions of other cameras of the camera array 310. In some embodiments, the relative pose module 354 applies the scale factor (discussed above with reference to FIG. 3) to determine the global position of a camera relative to the farming machine itself.

VI. Example Unfolded Calibration

Figure 6A:
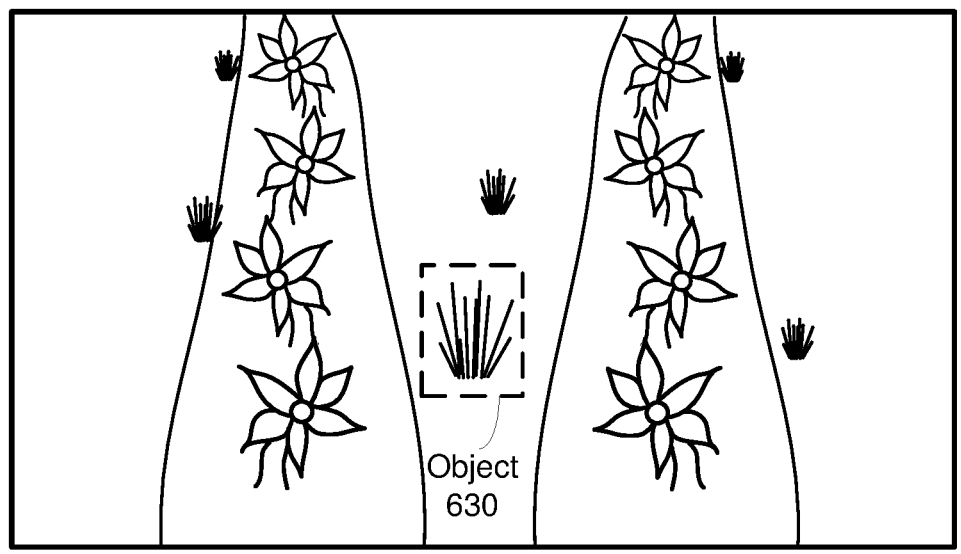
FIGS. 6A-C illustrate examples of a farming machine 500 performing an unfolded calibration, in accordance with an example embodiment.
Figure 6C:
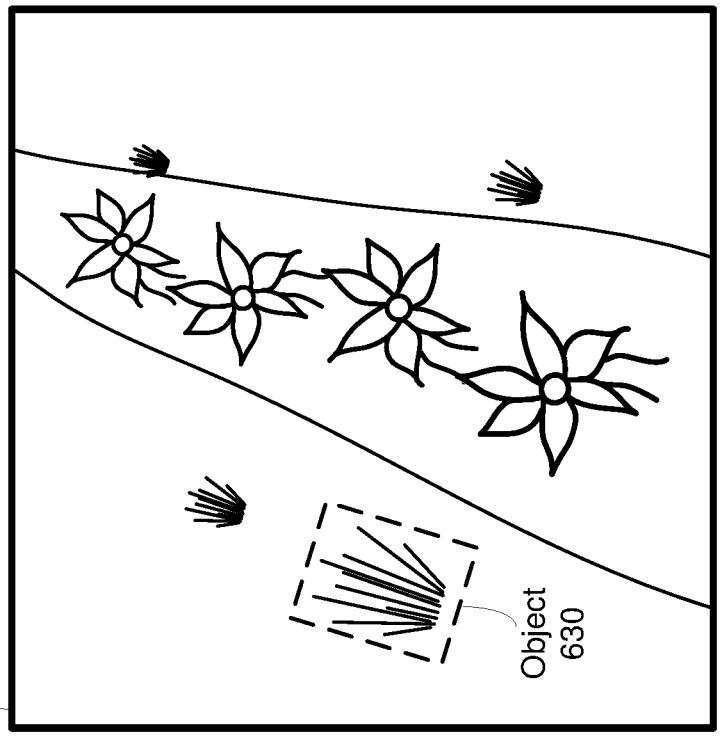
Figure 6B:
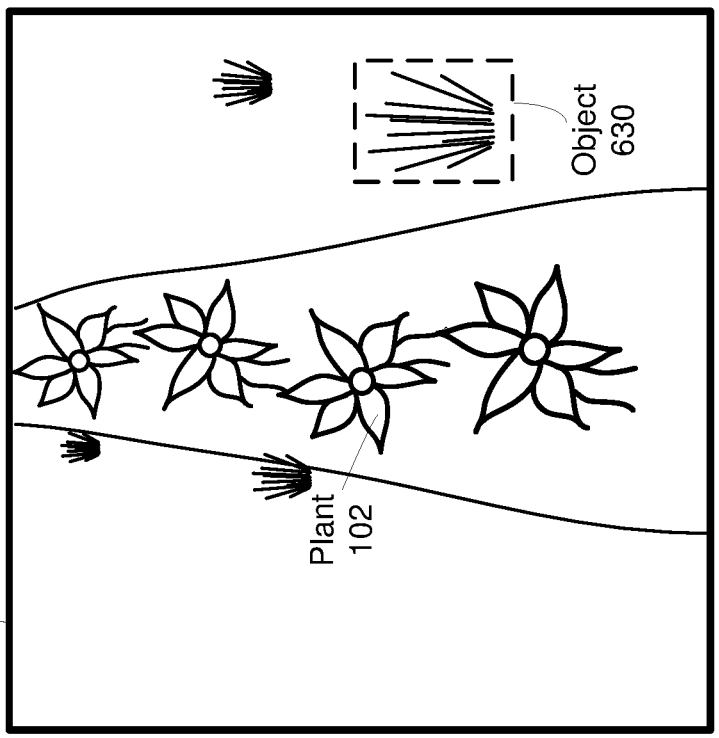

FIGS. 6A-C illustrate examples of a farming machine 500 performing an unfolded calibration, in accordance with an example embodiment. FIG. 6A illustrates an example scene from the field of view of a farming machine navigating through an environment. As the farming machine navigates through an environment, cameras mounted to the farming machine are facing outwards towards the surrounding in front of the farming machine. Accordingly, images captured by the cameras in this configuration include the area surrounding the farming machine, for example the scene 600. As the farming machine navigates through the environment, the cameras mounted to the farming machine may be knocked out of position or out of alignment by plants, tree branches, telephone poles, or other objects at the height for the farming machine. Accordingly, a farming machine may perform real-time calibration of the camera array based on external features of the area surrounding the farming machine to identify calibration errors arising under such circumstances. As discussed above with reference to FIG. 3, the calibration system 350 performs unfolded calibration of the camera array based on images with visual information including objects in the environment.

FIG. 6B illustrates an example of an image captured by a first camera mounted on the farming machine, in accordance with an example embodiment. The first camera image 610 is captured by a first camera that is positioned and oriented in its proper alignment. In FIG. 6B, the visual information of the first camera image 610 identifies features of the ground or soil in the field of view of the camera 610, for example the texture of the ground and the object 630. In the image 610, the object 630 is in the correct orientation and position, so the position and orientation characteristics extracted from the first camera image 610 will indicate that the first camera is in the proper orientation and position.

In comparison, FIG. 6C illustrates an example of an image captured by a second camera mounted on the farming machine in an incorrect orientation, in accordance with an example embodiment. The second camera is positioned adjacent to the first camera described with reference to FIG. 6B such that the object 630 is also in the field of view of the second camera. Thus, the second camera image 650 includes visual information that also identifies the object 630. However, in the image 650, the object 630 is not oriented in the proper upright position illustrated in the image 610. Thus, the position and orientation characteristics extracted from the second camera image 650 will indicate that the second camera is also not oriented in the same upright position as the first camera. Based on the differing orientations of the object 630 in the image 610 and the image 650, the relative pose between the first camera and the second camera can be determined, the calibration error between the first camera and the second camera can be identified, and the calibration error can be remedied by an operator before the farming machine navigates any further.

In some embodiments, the techniques discussed with reference to FIGS. 6A-6C may also be implemented during folded calibrations to calibrate the camera array 310 before the farming machine is deployed in a field.

VII. Computer System

Figure 7:
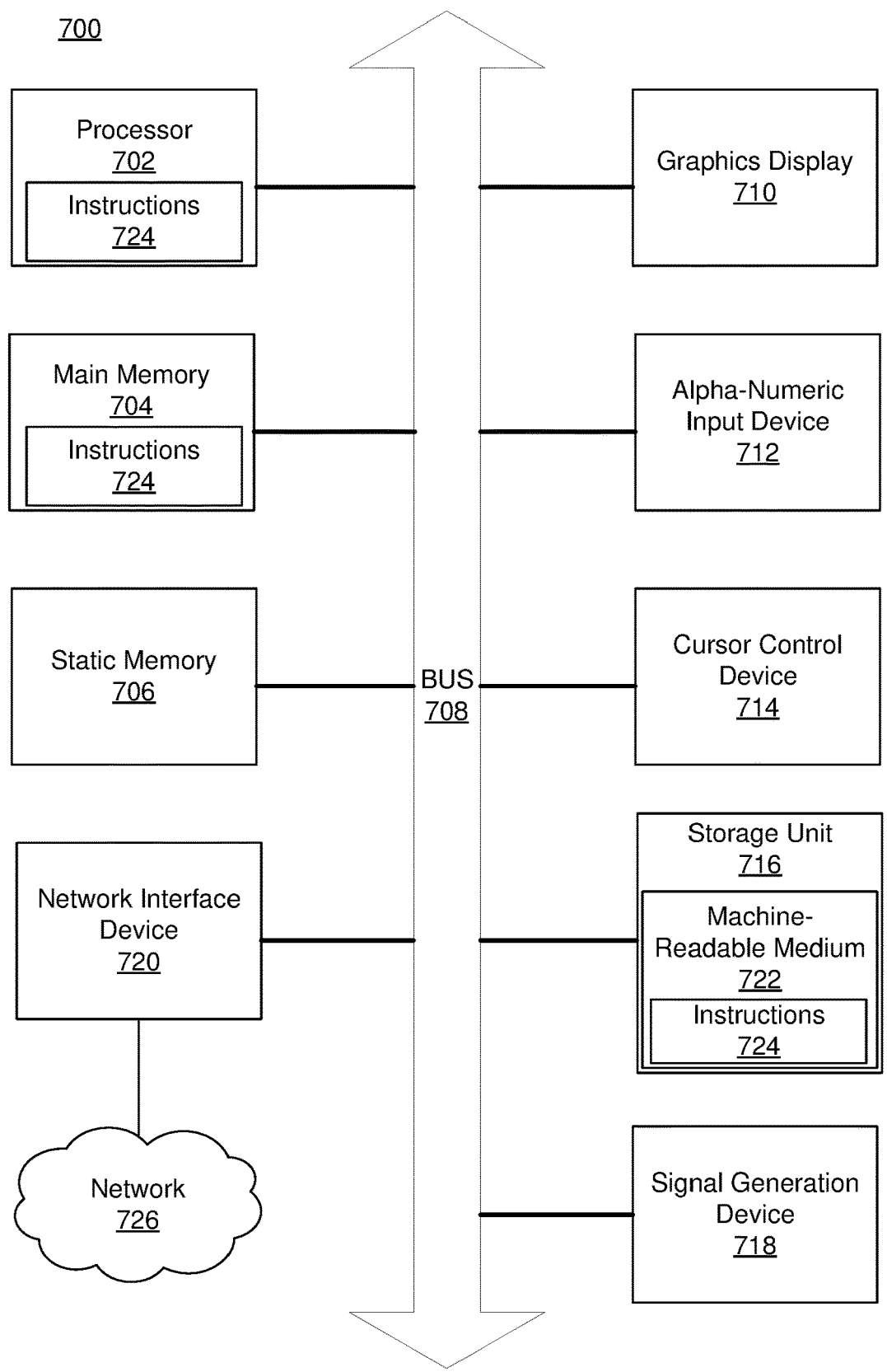
FIG. 7 is a block diagram illustrating components of an example machine for reading and executing instructions from a machine-readable medium, in accordance with an example embodiment.

FIG. 7 is a block diagram illustrating components of an example machine for reading and executing instructions from a machine-readable medium, in accordance with an example embodiment. Specifically, FIG. 7 shows a diagrammatic representation of control system 130 in the example form of a computer system 700. The computer system 700 can be used to execute instructions 724 (e.g., program code or software) for causing the machine to perform any one or more of the methodologies (or processes) described herein.

In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes one or more processing units (generally processor 702). The processor 702 is, for example, a central processing unit (CPU), a graphics processing unit (GPU), a digital signal processor (DSP), a control system, a state machine, one or more application specific integrated circuits (ASICs), one or more radio-frequency integrated circuits (RFICs), or any combination of these. The computer system 700 also includes a main memory 704. The computer system may include a storage unit 716. The processor 702, memory 704, and the storage unit 716 communicate via a bus 708.

In addition, the computer system 700 can include a static memory 706, a graphics display 710 (e.g., to drive a plasma display panel (PDP), a liquid crystal display (LCD), or a projector). The computer system 700 may also include alphanumeric input device 712 (e.g., a keyboard), a cursor control device 714 (e.g., a mouse, a trackball, a joystick, a motion sensor, or other pointing instrument), a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. For example, the instructions 724 may include the functionalities of modules of the system 130 described in FIG. 3. The instructions 724 may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 may be transmitted or received over a network 726 via the network interface device 720.

VIII. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer physically mounted within a machine 100. This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a system and a process for identifying and treating plants with a farming machine including a control system executing a semantic segmentation model. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for validating a calibration of a plurality of cameras on a farming machine having a mounting mechanism, the method comprising:
for each camera of the plurality of cameras on the farming machine, receiving an image comprising visual information representing a view of a portion of an area surrounding the farming machine;
for a first pair of cameras comprising a first camera of the plurality of cameras and a second camera of the plurality of cameras,
determining a first relative pose between the first pair of cameras, wherein the first relative pose comprises a position and an orientation of the first camera relative to the second camera by extracting relative position and orientation characteristics from information in both a first image received from the first camera and a second image received from the second camera;
identifying a calibration error for the first pair of cameras based on a comparison of the first relative pose with an expected relative pose between the first pair of cameras, wherein the expected relative pose is described by a virtual representation of the farming machine and comprises an expected position and an expected orientation of the first camera relative to the second camera; and transmitting, to an operator of the farming machine, a notification comprising the calibration error and instructions to remedy the calibration error.

2. The method of claim 1, further comprising:
accessing the first relative pose and a second relative pose between a second pair of cameras, the second pair of cameras comprising the second camera and a third camera of the plurality of cameras;
determining that the second camera is adjacent to both the first camera and the third camera based on a comparison of the first relative pose and the second relative pose; and
responsive to determining that the second camera is adjacent to both the first camera and the third camera, updating the calibration error based on the second relative pose.

3. The method of claim 1, wherein visual information of the first image comprises one or more parts of the farming machine, and the method further comprises:
determining a first position of the first camera on the farming machine based on visual information of the first image representing the one or more parts of the farming machine;
determining a second position of the second camera on the farming machine based on the position of the first camera; and
determining the first relative pose based on the determined first position and the determined second position.

4. The method of claim 1, further comprising:
identifying, from the plurality of cameras, a first end camera positioned at a first end of the mounting mechanism and a second end camera positioned at a second end of the mounting mechanism based on hardware addresses defined in the virtual representation of the farming machine for each camera of the plurality of cameras; and
calibrating the first end camera and the second end camera by:
determining a second calibration error between the first end camera and the second end camera based on a comparison of a second relative pose between the first end camera and the second end camera with an expected relative pose between the first end camera and the second end camera; and
distributing the calibration error across a plurality of camera pairs of the plurality of cameras located between the first end camera and the second end camera.

5. The method of claim 1, wherein the first image and the second image comprise a part of the farming machine, and the method further comprises:
extracting position characteristics from visual information of the first image representing the part of the farming machine, the extracted position characteristics describing the pose of the first camera relative to the part of the farming machine;
extracting position characteristics from visual information of the second image representing the part of the farming machine, the extracted position characteristics describing the pose of the second camera relative to the part of the farming machine; and
determining the first relative pose by comparing the extracted position characteristics from the visual information of the first image and the visual information of the second image.

6. The method of claim 1, wherein the first image and the second image comprise a fiducial marker in the portion of the area surrounding the farming machine, and the method further comprises:
extracting position characteristics from visual information of the first image representing the fiducial marker, the extracted position characteristics describing the pose of the first camera relative to the fiducial marker;
extracting position characteristics from visual information of the second image representing the fiducial marker, the extracted position characteristics describing the pose of the second camera relative to the fiducial marker; and
determining the first relative pose by comparing the extracted position characteristics from the visual information of the first image to the extracted position characteristics of the visual information of the second image.

7. The method of claim 1, further comprising:
accessing, from the virtual representation of the farming machine, a first position associated with a first processor operating the first camera using on a first hardware address of the first camera;
accessing, from the virtual representation of the farming machine, a second position associated with a second processor operating the second camera using on a second hardware address of the second camera; and
determining the expected relative pose between the first pair of cameras by comparing first position associated with the first hardware address and the second position associated with the second hardware address.

8. The method of claim 1, wherein determining the first relative pose comprises:
measuring, by a sensor mounted on the farming machine, a first height of the first camera relative to a ground surface and a second height of the second camera relative to the ground surface;
determining a scale factor for relative pose determination based on the measured first height and second height; and
determining the first relative pose based on the scale factor.

9. The method of claim 1, wherein determining the first relative pose comprises:
determining a first angle of the first camera relative to a ground surface and a second angle of the second camera relative to the ground surface; and
determining the first relative pose based on the first angle and the second angle.

10. The method of claim 1, wherein determining the first relative pose comprises:
determining a scale factor for the first camera and the second camera representing a quantification of a relationship between distances captured in the first image and the second image and actual distances in the area surrounding the farming machine; and
determining the relative first pose between the first pair of cameras based on the scale factor.

11. The method of claim 1, wherein the second camera is positioned on the farming machine adjacent to the first camera, and the method further comprises:
comparing visual information of the first image to visual information of the second image;
responsive to determining the visual information of the first image does not overlap with the visual information of the second image, comparing the visual information of the first image to visual information of images captured by other cameras of the plurality of cameras;

identifying, from the images captured by the other cameras, a third camera that captured an image with visual information overlapping with the visual information of the first image; and transmitting, to the operator of the farming machine, a notification identifying the first camera and the third camera as an adjacent pair of cameras.

12. A non-transitory computer-readable storage medium comprising computer program instructions for validating a calibration of a plurality of cameras on a farming machine having a mounting mechanism that, when executed by a computer processor, cause the processor to:

for each camera of the plurality of cameras on the farming machine, receive an image comprising visual information representing a view of a portion of an area surrounding the farming machine;

for a first pair of cameras comprising a first camera of the plurality of cameras and a second camera of the plurality of cameras, determine a first relative pose between the first pair of cameras, wherein the first relative pose comprises a position and an orientation of the first camera relative to the second camera by extracting relative position and orientation characteristics from visual information in both a first image received from the first camera and a second image received from the second camera;

identify a calibration error for the first pair of cameras based on a comparison of the first relative pose with an expected relative pose between the first pair of cameras wherein the expected relative pose is described by a virtual representation of the farming machine and comprises an expected position and an expected orientation of the first camera relative to the second camera; and transmit, to an operator of the farming machine, a notification comprising the calibration error and instructions to remedy the calibration error.

13. The non-transitory computer-readable storage medium of claim 12, further comprising instructions that cause the processor to:

access the first relative pose and a second relative pose between a second pair of cameras, the second pair of cameras comprising the second camera and a third camera of the plurality of cameras; and determine that the second camera is adjacent to both the first camera and the third camera based on a comparison of the first relative pose and the second relative pose; and responsive to determining that the second camera is adjacent to both the first camera and the third camera, update the calibration error based on the second relative pose.

14. The non-transitory computer-readable storage medium of claim 12, wherein visual information of the first image comprises one or more parts of the farming machine, the non-transitory computer readable storage medium further comprising instructions that cause the processor to:

determine a first position of the first camera on the farming machine based on visual information of the first image representing the one or more parts of the farming machine;

determine a second position of the second camera on the farming machine based on the position of the first camera; and determine the first relative pose based on the determined first position and the determined second position.

15. The non-transitory computer-readable storage medium of claim 12, further comprising instructions that cause the processor to:

identify, from the plurality of cameras, a first end camera positioned at a first end of the mounting mechanism and a second end camera positioned at a second end of the mounting mechanism based on hardware addresses defined in the virtual representation of the farming machine for each camera of the plurality of cameras;

calibrate the first end camera and the second end camera by:

determining a second calibration error between the first end camera and the second end camera based on a comparison of a second relative pose between the first end camera and the second end camera with an expected relative pose between the first end camera and the second end camera; and distributing the calibration error across a plurality of camera pairs of the plurality of cameras located between the first end camera and the second end camera.

16. The non-transitory computer-readable storage medium of claim 12, wherein the first image and the second image comprise a part of the farming machine, the non-transitory computer readable storage medium further comprising instructions that cause the processor to:

extract position characteristics from visual information of the first image representing the part of the farming machine, the extracted position characteristics describing the pose of the first camera relative to the part of the farming machine;

extract position characteristics from visual information of the second image representing the part of the farming machine, the extracted position characteristics describing the pose of the second camera relative to the part of the farming machine; and determine the first relative pose by comparing the extracted position characteristics from the visual information of the first image and the visual information of the second image.

17. The non-transitory computer-readable storage medium of claim 12, wherein the first image and the second image comprise a fiducial marker in the portion of the area surrounding the farming machine, the non-transitory computer readable storage medium further comprising instructions that cause the processor to:

extract position characteristics from visual information of the first image representing the fiducial marker, the extracted position characteristics describing the pose of the first camera relative to the fiducial marker;

extract position characteristics from visual information of the second image representing the fiducial marker, the extracted position characteristics describing the pose of the second camera relative to the fiducial marker; and determine the first relative pose by comparing the extracted position characteristics from the visual information of the first image to the extracted position characteristics of the visual information of the second image.

18. The non-transitory computer-readable storage medium of claim 12, further comprising instructions that cause the processor to:

access, from the virtual representation of the farming machine, a first position associated with a first processor operating the first camera using on a first hardware address of the first camera;

access, from the virtual representation of the farming machine, a second position associated with a second processor operating the second camera using on a second hardware address of the second camera; and determine the expected relative pose between the first pair of cameras by comparing first position associated with the first hardware address and the second position associated with the second hardware address.

19. The non-transitory computer-readable storage medium of claim 12, wherein instructions for determining the first relative pose cause the processor to:

determine a scale factor for the first camera and the second camera representing a quantification of a relationship between distances captured in the first image and the second image and actual distances in the area surrounding the farming machine; and determine the relative first pose between the first pair of cameras based on the scale factor.

20. The non-transitory computer-readable storage medium of claim 12, wherein instructions for determining the first relative pose cause the processor to:

determine a first angle of the first camera relative to a ground surface and a second angle of the second camera relative to the ground surface; and determine the first relative pose based on the first angle and the second angle.

21. The non-transitory computer-readable storage medium of claim 12, wherein instructions for determining the first relative pose cause the processor to:

determining a scale factor for the first camera and the second camera representing a quantification of a relationship between distances captured in the first image and the second image and actual distances in the area surrounding the farming machine;

determining the relative first pose between the first pair of cameras based on the scale factor for the first camera and the second camera.

22. The non-transitory computer-readable storage medium of claim 12, wherein the second camera is positioned on the farming machine adjacent to the first camera, the instructions further comprising instructions that cause the processor to:

compare visual information of the first image to visual information of the second image;

responsive to determining the visual information of the first image does not overlap with the visual information of the second image, compare the visual information of the first image to visual information of images captured by other cameras of the plurality of cameras;

identify, from the images captured by the other cameras, a third camera that captured an image with visual information overlapping with the visual information of the first image; and transmit, to the operator of the farming machine, a notification identifying the first camera and the third camera as an adjacent pair of cameras.

23. A farming machine comprising:

a plurality of cameras mounted to a mounting mechanism for the farming machine; and a computing device; and a non-transitory computer-readable storage medium comprising computer program instructions for validating a calibration of the plurality of cameras that, when executed by the computing device, cause the computing device to:

for each camera of the plurality of cameras on the farming machine, receiving an image comprising visual information representing a view of a portion of an area surrounding the farming machine;

for a first pair of cameras comprising a first camera of the plurality of cameras and a second camera of the plurality of cameras, determine a first relative pose between the first pair of cameras, wherein the first relative pose comprises a position and an orientation of the first camera relative to the second camera by extracting relative position and orientation characteristics from visual information in both a first image received from the first camera and a second image received from the second camera;

identify a calibration error for the first pair of cameras based on a comparison of the first relative pose with an expected relative pose between the first pair of cameras, wherein the expected relative pose is described by a virtual representation of the farming machine and comprises an expected position and an expected orientation of the first camera relative to the second camera; and transmit, to an operator of the farming machine, a notification comprising the calibration error and instructions to remedy the calibration error.

* * * * *